United States Patent
Amin et al.

(10) Patent No.: US 10,454,953 B1
(45) Date of Patent: *Oct. 22, 2019

(54) SYSTEM AND METHOD FOR SEPARATED PACKET PROCESSING AND STATIC ANALYSIS

(71) Applicant: FireEye, Inc., Milpitas, CA (US)

(72) Inventors: Muhammad Amin, Fremont, CA (US); Masood Mehmood, Fremont, CA (US); Ramaswamy Ramaswamy, Fremont, CA (US); Madhusudan Challa, San Jose, CA (US); Shrikrishna Karandikar, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,436

(22) Filed: Oct. 9, 2017

Related U.S. Application Data

(63) Continuation of application No. 15/451,243, filed on Mar. 6, 2017, now Pat. No. 9,787,700, and a
(Continued)

(51) Int. Cl.
*H04L 29/06* (2006.01)
*H04L 29/12* (2006.01)

(52) U.S. Cl.
CPC ...... *H04L 63/1416* (2013.01); *H04L 63/1433* (2013.01); *H04L 61/1511* (2013.01); *H04L 67/42* (2013.01)

(58) Field of Classification Search
CPC ............. H04L 63/1416; H04L 63/1433; H04L 61/1511; H04L 67/42; H04L 63/14; H04L 63/1408; H04L 63/1425
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).
(Continued)

*Primary Examiner* — Matthew Smithers
(74) *Attorney, Agent, or Firm* — Rutan & Tucker, LLP

(57) ABSTRACT

According to one embodiment, a system features a network security device and a cloud computing service. The network security device is configured to determine whether an object includes one or more characteristics associated with a malicious attack. The cloud computing service, communicatively coupled to and remotely located from the network security device, includes virtual execution logic that, upon execution by a processing unit deployed as part of the cloud computing service and after the network security device determining that the object includes the one or more characteristics associated with the malicious attack, processes the object and monitors for behaviors of at least the object suggesting the object is associated with a malicious attack.

33 Claims, 10 Drawing Sheets

Related U.S. Application Data continuation of application No. 14/229,541, filed on Mar. 28, 2014, now Pat. No. 9,591,015.

(56) References Cited

U.S. PATENT DOCUMENTS

| | | |
|---|---|---|
| 5,278,901 A | 1/1994 | Shieh et al. |
| 5,319,776 A | 6/1994 | Hile et al. |
| 5,440,723 A | 8/1995 | Arnold et al. |
| 5,452,442 A | 9/1995 | Kephart |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,889,973 A | 3/1999 | Moyer |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,818,800 B1 | 10/2010 | Lemley, III et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |

(56) References Cited

U.S. PATENT DOCUMENTS

| | | | |
|---|---|---|---|
| 8,321,240 B2 | 11/2012 | Lorsch | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,468,604 B2 | 6/2013 | Claudatos et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,695,097 B1 | 4/2014 | Mathes et al. | |
| 8,707,437 B1 | 4/2014 | Ming-Chang et al. | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,769,692 B1 * | 7/2014 | Muttik | H04L 63/1416 726/22 |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,869,144 B2 | 10/2014 | Pratt et al. | |
| 8,879,558 B1 | 11/2014 | Rijsman | |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,959,428 B2 | 2/2015 | Majidian | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,009,834 B1 | 4/2015 | Ren et al. | |
| 9,015,814 B1 | 4/2015 | Zakorzhevsky et al. | |
| 9,027,135 B1 | 5/2015 | Aziz | |
| 9,071,638 B1 | 6/2015 | Aziz et al. | |
| 9,092,625 B1 | 7/2015 | Kashyap et al. | |
| 9,104,814 B1 | 8/2015 | Mompoint et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,165,142 B1 * | 10/2015 | Sanders | G06F 21/566 |
| 9,171,157 B2 | 10/2015 | Flores et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,355,246 B1 | 5/2016 | Wan et al. | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 * | 7/2016 | Karandikar | H04L 63/1408 |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 * | 3/2017 | Amin | H04L 63/1416 |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,546 B1 | 5/2017 | Manni et al. | |
| 9,654,485 B1 | 5/2017 | Neumann | |
| 9,661,009 B1 | 5/2017 | Karandikar et al. | |
| 9,661,018 B1 | 5/2017 | Aziz | |
| 9,674,298 B1 | 6/2017 | Edwards et al. | |
| 9,680,862 B2 | 6/2017 | Ismael et al. | |
| 9,690,606 B1 | 6/2017 | Ha et al. | |
| 9,690,933 B1 | 6/2017 | Singh et al. | |
| 9,690,935 B2 | 6/2017 | Shiffer et al. | |
| 9,690,936 B1 | 6/2017 | Malik et al. | |
| 9,736,179 B2 | 8/2017 | Ismael | |

(56) References Cited

U.S. PATENT DOCUMENTS

| | | |
|---|---|---|
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,773,240 B1 | 9/2017 | McCauley |
| 9,781,144 B1 | 10/2017 | Otvagin et al. |
| 9,787,700 B1* | 10/2017 | Amin ................ H04L 63/1416 |
| 9,787,706 B1 | 10/2017 | Otvagin et al. |
| 9,792,196 B1 | 10/2017 | Ismael et al. |
| 9,804,948 B2 | 10/2017 | Kolberg et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,860 B1 | 3/2018 | Banga et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,265,627 B2 | 4/2019 | Ghanchi |
| 10,366,231 B1 | 7/2019 | Singh et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0051168 A1* | 3/2003 | King ................... G06F 1/183 726/4 |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0199569 A1* | 10/2004 | Kalkunte ................ H04L 69/40 709/201 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0022018 A1 | 1/2005 | Szor |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |

(56) References Cited

U.S. PATENT DOCUMENTS

| | | |
|---|---|---|
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0129382 A1 | 6/2006 | Anand et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0253906 A1 | 11/2006 | Rubin et al. |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0169195 A1 | 7/2007 | Anand et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240215 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0163356 A1 | 7/2008 | Won-Jip et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0076791 A1 | 3/2009 | Rhoades et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0204514 A1 | 8/2009 | Bhogal et al. |
| 2009/0228233 A1 | 9/2009 | Anderson et al. |
| 2009/0241187 A1 | 9/2009 | Troyansky |
| 2009/0241190 A1* | 9/2009 | Todd ............... G06F 21/53 726/23 |
| 2009/0265692 A1 | 10/2009 | Godefroid et al. |
| 2009/0271866 A1 | 10/2009 | Liske |
| 2009/0271867 A1* | 10/2009 | Zhang ............... G06F 21/56 726/24 |
| 2009/0300415 A1 | 12/2009 | Zhang et al. |
| 2009/0300761 A1 | 12/2009 | Park et al. |
| 2009/0328185 A1* | 12/2009 | Berg ............... H04L 63/0245 726/13 |
| 2009/0328221 A1* | 12/2009 | Blumfield ............... G06F 21/564 726/24 |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0103837 A1* | 4/2010 | Jungck ............... H04L 29/12066 370/252 |

(56) References Cited

U.S. PATENT DOCUMENTS

| | | |
|---|---|---|
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2010/0306825 A1 | 12/2010 | Spivack |
| 2010/0332593 A1* | 12/2010 | Barash .......... H04L 63/145 709/203 |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0113427 A1 | 5/2011 | Dotan |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0302656 A1 | 12/2011 | El-Moussa |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320816 A1 | 12/2011 | Yao et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0167219 A1 | 6/2012 | Zaitsev et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0284710 A1 | 11/2012 | Vinberg |
| 2012/0297489 A1 | 11/2012 | Dequevy |
| 2012/0304244 A1* | 11/2012 | Xie .......... G06F 21/00 726/1 |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0247187 A1 | 9/2013 | Hsiao et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333046 A1* | 12/2013 | Sambamurthy ......... G06F 21/10 726/26 |
| 2014/0026217 A1 | 1/2014 | Saxena et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0096184 A1* | 4/2014 | Zaitsev .......... G06F 21/56 726/1 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1 | 6/2014 | Spernow et al. |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0317735 A1* | 10/2014 | Kolbitsch .......... H04L 63/145 726/23 |
| 2014/0325344 A1 | 10/2014 | Bourke et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0026810 A1 | 1/2015 | Friedrichs et al. |
| 2015/0096022 A1* | 4/2015 | Vincent .......... G06F 21/566 726/23 |
| 2015/0096023 A1 | 4/2015 | Mesdaq et al. |
| 2015/0096024 A1 | 4/2015 | Haq et al. |

(56) References Cited

U.S. PATENT DOCUMENTS

| | | | |
|---|---|---|---|
| 2015/0096025 A1* | 4/2015 | Ismael | G06F 21/566 726/23 |
| 2015/0121526 A1 | 4/2015 | McLamon et al. | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0244732 A1 | 8/2015 | Golshan et al. | |
| 2015/0363598 A1* | 12/2015 | Xu | G06F 21/563 726/23 |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0335110 A1 | 11/2016 | Paithane et al. | |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddiqui et al. | |
| 2018/0357812 A1 | 12/2018 | Church | |
| 2019/0066377 A1 | 2/2019 | Schoening | |

FOREIGN PATENT DOCUMENTS

| | | |
|---|---|---|
| WO | 0223805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Packet", Microsoft Computer Dictionary Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results (subset). "attack vector identifier" Http://www.altavista.com/web/results?Itag=ody&pg=aq&aqmode=aqa=Event+Orchestrator . . . , (Accessed on Sep. 15, 2009).
AltaVista Advanced Search Results (subset). "Event Orchestrator". Http://www.altavista.com/web/results?Itag=ody&pg=aq&aqmode=aqa=Event+Orchesrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists,org/honeypots/2003/q2/319 ("Boubalos"), (Jun. 5, 2003).
Bowen, B. M. et al "BotSwindler: Tamper Resistant Injection of Believable Decoys in VM-Based Hosts for Crimeware Detection", in Recent Advances in Intrusion Detection, Springer ISBN: 978-3-642-15511-6 (pp. 118-137) (Sep. 15, 2010).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.

(56) References Cited

OTHER PUBLICATIONS

IEEE Xplore Digital Library Sear Results (subset) for "detection of unknown computer worms". Http//ieeexplore.ieee.org/searchresult.jsp?SortField=Score&SortOrder=desc&ResultC . . . (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (Dec. 2002).

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb—Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College, ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., Computer Intrusion Detection and Network Monitoring: A Statistical ("Marchette"), (2001).

Margolis, P.E., "Random House Webster's Computer & Internet Dictionary 3rd Edition", ISBN 0375703519, p. 595 (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "Sandboxii: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

PCT/US2014/043726 filed Jun. 23, 2014 International Search Report and Written Opinion dated Oct. 9, 2014.

PCT/US2015/067082 filed Dec. 21, 2015 International Search Report and Written Opinion dated Feb. 24, 2016.

Peter M. Chen, and Brian D. Noble, "When Virtual Is Better Than Real, Department of Electrical Engineering and Computer Science", University of Michigan ("Chen"), (2001).

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/~casado/pcap/sectionl.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 11/717,475, filed Mar. 12, 2007 Final Office Action dated Feb. 27, 2013.

U.S. Appl. No. 11/717,475, filed Mar. 12, 2007 Final Office Action dated Nov. 22, 2010.

U.S. Appl. No. 11/717,475, filed Mar. 12, 2007 Non-Final Office Action dated Aug. 28, 2012.

U.S. Appl. No. 11/717,475, filed Mar. 12, 2007 Non-Final Office Action dated May 6, 2010.

U.S. Appl. No. 13/925,688, filed Jun. 24, 2013 Final Office Action dated Jan. 12, 2017.

U.S. Appl. No. 13/925,688, filed Jun. 24, 2013 Final Office Action dated Mar. 11, 2016.

U.S. Appl. No. 13/925,688, filed Jun. 24, 2013 Non-Final Office Action dated Jun. 2, 2015.

U.S. Appl. No. 13/925,688, filed Jun. 24, 2013 Non-Final Office Action dated Sep. 16, 2016.

U.S. Appl. No. 14/059,381, filed Oct. 21, 2013 Non-Final Office Action dated Oct. 29, 2014.

U.S. Appl. No. 14/229,541, filed Mar. 28, 2014 Non-Final Office Action dated Apr. 20, 2016.

U.S. Appl. No. 14/620,060, filed Feb. 11, 2015, Non-Final Office Action dated Apr. 3, 2015.

U.S. Appl. No. 14/675,648, filed Mar. 31, 2015 Notice of Allowance dated Jul. 5, 2016.

U.S. Appl. No. 15/339,459, filed Oct. 31, 2016 Non-Final Office Action dated Feb. 9, 2017.

U.S. Appl. No. 15/451,243, filed Mar. 6, 2017 Notice of Allowance dated Jul. 26, 2017.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Mathew M., "Throttling Virses: Restricting Propagation to Defeat Malicious Mobile Code", ACSAC Conference, Las Vegas, NV, USA, (Dec. 2002), pp. 1-9.

(56) References Cited

OTHER PUBLICATIONS

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

U.S. Appl. No. 14/579,896, filed Dec. 22, 2014 Advisory Action dated Aug. 23, 2016.

U.S. Appl. No. 14/579,896, filed Dec. 22, 2014 Final Office Action dated Jul. 6, 2016.

U.S. Appl. No. 14/579,896, filed Dec. 22, 2014 Non-Final Office Action dated Mar. 22, 2016.

U.S. Appl. No. 14/579,896, filed Dec. 22, 2014 Non-Final Office Action dated Oct. 18, 2016.

U.S. Appl. No. 14/579,896, filed Dec. 22, 2014 Notice of Allowance dated Mar. 1, 2017.

U.S. Appl. No. 14/586,233, filed Dec. 30, 2014 Advisory Action dated Jun. 13, 2017.

U.S. Appl. No. 14/586,233, filed Dec. 30, 2014 Final Office Action dated Mar. 9, 2017.

U.S. Appl. No. 14/586,233, filed Dec. 30, 2014 Non-Final Office Action dated Aug. 24, 2016.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

U.S. Appl. No. 14/316,716 filed Jun. 26, 2014 Non-Final Office Action dated Jul. 1, 2019.

U.S. Appl. No. 14/577,909 filed Dec. 19, 2014 Non-Final Office Action dated Jul. 30, 2019.

U.S. Appl. No. 14/577,920 filed Dec. 19, 2014 Final Office Action dated Jul. 10, 2019.

U.S. Appl. No. 15/831,311 filed Dec. 4, 2017 Non-Final Office Action dated Jul. 22, 2019.

\* cited by examiner

SYSTEM AND METHOD FOR SEPARATED PACKET PROCESSING AND STATIC ANALYSIS

CROSS-REFERENCE TO RELATED APPLICATIONS

This application is a continuation of U.S. application Ser. No. 15/451,243, filed on Mar. 6, 2017 (U.S. Pat. No. 9,787,700), which is a continuation of U.S. application Ser. No. 14/229,541, filed on Mar. 28, 2014 (U.S. Pat. No. 9,591,015), the entire contents of both of these applications are incorporated by reference herein.

1. FIELD

Embodiments of the disclosure relate to the field of network security. More specifically, embodiments of the disclosure relates to a system, apparatus and method for conducting packet processing and/or static analysis of objects by a traffic analysis controller being logic different from a host in order to offload packet processing and/or static analysis from the host.

2. GENERAL BACKGROUND

Over the last decade, malicious software has become a pervasive problem for Internet users as most networked resources include software vulnerabilities that are subject to attack. For instance, over the past few years, more and more vulnerabilities are being discovered in software that is loaded onto computers, such as vulnerabilities within operating systems for example. While some vulnerabilities continue to be addressed through software patches, prior to the release of such software patches, network resources continue to be targeted by exploits.

In general, an exploit is information that attempts to take advantage of a vulnerability by adversely influencing or attacking normal operations of a targeted computer. As an illustrative example, a Portable Execution Format (PDF) file may be infected with an exploit that is activated upon execution (opening) of the PDF file and takes advantage of a vulnerability associated with a certain type and version of a PDF Reader application.

Currently, one type of network security device widely used for detecting exploits is designed to identify packets suspected of containing known exploits, attempt to block/halt propagation of such exploits, and log/report information associated with such packets through an alert. In particular, this conventional network security device is implemented with a processor that is wholly responsible for performing packet processing, a static analysis and a dynamic analysis. This type of conventional network security device may experience certain disadvantages.

For instance, one disadvantage with conventional network security devices is that the packet processing, the static analysis and the dynamic analysis may simultaneously request limited resources of the network security device's processor. Such simultaneous need for the processor's resources inherently leads to one or more processes waiting on others to finish and subsequently relinquish the processor's resources. This dilemma limits the speed, efficiency and detection efficacy at which the network security device may analyze received network traffic, especially when the network traffic is being received at a high rate.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
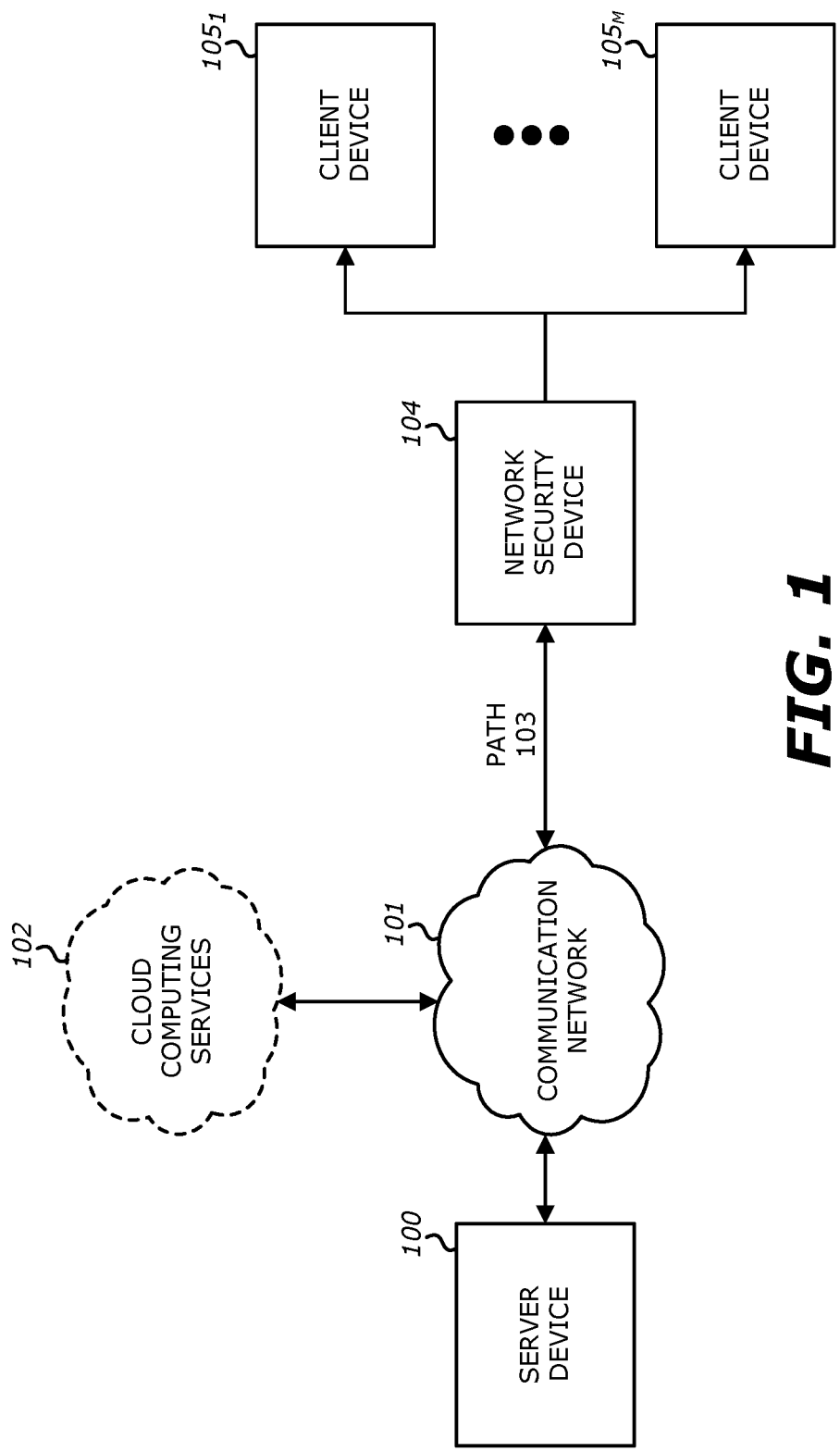
FIG. 1 is an illustration of an exemplary block diagram of a flow of network traffic within a networking system.

Various embodiments of the disclosure relate to an electronic device with network connectivity, such as a network security device for example, where the electronic device comprises a traffic analysis controller (TAC) and threat detection and prevention (TDP) logic. According to one embodiment of the disclosure, the traffic analysis controller comprises a packet capture framework (PCF) which captures packets or objects from received network traffic. The PCF passes the captured objects to a set of pre-filters which comprises logic to determine whether an object is "of interest," namely whether the object is of or contains a particular type of network traffic. In one embodiment, an object that is determined to be "of interest" is passed to either a static analysis engine operating on the traffic analysis controller and/or a dynamic analysis engine operating separate from the traffic analysis controller but within the network security device (e.g., part of the TDP logic).

For instance, as illustrated embodiments, the network security device may be implemented as a network appliance with a chassis housing, where both the traffic analysis controller and the TDP logic are implemented and contained within the same chassis housing. Where the network security device is implemented as a rack of blade servers, it is contemplated that the traffic analysis controller may be deployed within a first blade server while the TDP logic is deployed within the first blade server or a different (second) blade server that is communicatively coupled to the first blade server.

According to this embodiment of the disclosure, the static analysis engine comprises at least one subsystem that conducts a static analysis on incoming objects, where the analysis of the objects is conducted without certain types of processing (e.g., opening an object, running the object, etc.). The static analysis may include signature matching (e.g., exploit signature checks, vulnerability checks), heuristic analysis (e.g., statistical analysis), source reputation checking, blacklist or whitelist checking, or the like. For instance, the static analysis engine subsystem(s) associated with signature matching may comprise logic that conducts exploit signature checks and/or vulnerability signature checks on objects of at least a first traffic-type (e.g., domain name system "DNS") to identify whether characteristics of any of these objects indicate that the object is associated with a malicious attack (e.g., indicative of an exploit). Furthermore, another static analysis engine subsystem may be associated with heuristics that examines the metadata or attributes of the object to determine whether a certain portion of the object has characteristics that suggest the object is an exploit and/or is associated with a malicious attack.

Furthermore, the dynamic analysis engine also comprises one or more dynamic analysis engine subsystems. For instance, a dynamic analysis engine subsystem may comprise virtual execution logic to automatically analyze, without user assistance, content within objects of at least a second traffic-type (e.g., "Hypertext Transfer Protocol "HTTP") in order to determine whether any of these objects is an exploit. Such objects or packets are provided to the dynamic analysis engine from the traffic analysis controller automatically and without user assistance.

Therefore, by compartmentalizing the packet processing and the virtual machine (VM)-based processing, the amount of network traffic that the network security device may process over a given time period is now scalable. Furthermore, using a network processing unit (NPU) on the traffic analysis controller for packet processing allows for an increased processing speed due to hardware acceleration, as much of the packet processing is done within the hardware and/or firmware of the NPU.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Herein, the term "traffic analysis controller" (TAC) may be construed as logic that conducts packet processing and/or some static analysis of received objects to determine (1) whether further in-depth processing of the object is needed to determine whether the object is "malicious" (e.g., associated with a malicious attack) or benign and/or (2) whether an alert or other warning scheme is needed to advise an administrator of the results from the static analysis. According to one embodiment of the disclosure, the traffic analysis controller comprises a processor having access to on-chip or off-chip memory and being implemented on a substrate. The substrate may be one of several form factors including, but not limited or restricted to, a network interface card, an expansion card, a circuit board, a semiconductor component, or a plug-in module. In one embodiment, the traffic analysis controller may be a network interface card that comprises a network processing unit communicatively coupled to a non-volatile memory, where the memory includes several software modules that, when executed, conducts packet processing and static analysis of objects as described below.

A "processing unit" may be construed as any type of logic with data processing capability, including a general purpose processor, a processor core, a micro-controller, an application specific integrated circuit (ASIC), a network processor, a digital signal processor, a virtual processor, a field-programmable gate array (FPGA), or the like.

Herein, the term "object" generally refers to a collection of data, whether in transit (e.g., over a network) or at rest (e.g., stored), often having a logical structure or organization that enables it to be classified for purposes of analysis. During static analysis, for example, the object may exhibit a set of expected characteristics and, during processing, a set of expected behaviors. The object may also exhibit a set of unexpected characteristics and a set of unexpected behaviors that may be evidence of an exploit and potentially allow the object to be classified as an exploit.

Examples of objects may include one or more flows or a self-contained element within a flow itself. A "flow" generally refers to related packets that are received, transmitted, or exchanged during a communication session and multiple flows are related packets that are received, transmitted or exchanged during related communication sessions. For convenience, a "packet" is broadly referred to as a series of bits or bytes having a prescribed format, which may include all types of network packets, frames, or cells.

As an illustrative example, an object may include a set of (one or more) flows such as (1) a sequence of transmissions in accordance with a particular communication protocol (e.g., User Datagram Protocol (UDP); Transmission Control Protocol (TCP); or HTTP; etc.), or (2) inter-process communications (e.g. Remote Procedure Call "RPC" or analogous processes, etc.). Similarly, as another illustrative example, the object may be a self-contained element, where different types of such objects may include a non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

An "exploit" may be construed as information (e.g., executable code, data, command(s), etc.) that is associated with a malicious attack on an electronic device, namely an attempt, normally unbeknownst to its user, to (1) alter control of the electronic device where the change in control is unwanted or unintended by the user and/or (2) gain access to stored information or information that is available to the user. According to one embodiment, an exploit attempts to take advantage of a vulnerability. Typically, a "vulnerability" is a coding error or artifact of software (e.g., computer program) that allows an attacker to alter legitimate control flow during processing of the software (computer program) by an electronic device, and thus, causes the electronic device to experience undesirable or unexpected behaviors. The undesired or unexpected behaviors may include a communication-based anomaly or an execution-based anomaly, which, for example, could (1) alter the functionality of an electronic device executing application software in a malicious manner; (2) alter the functionality of the electronic device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

"Malware" may be construed as computer code that executes an exploit to take advantage of a vulnerability, for example, to harm or co-opt operation of an electronic device or misappropriate, modify or delete data. Conventionally, malware is often said to be designed with malicious intent. An object may constitute or contain an exploit and/or malware.

The term "object of interest" may be construed as any object of the received network traffic associated with a packet selected by a pre-filter to be routed to one or more of the subsystems of either the static analysis engine or the dynamic analysis engine. For instance, an object of interest to the communication protocol traffic subsystem may be any object of a flow such as a sequence of transmissions in accordance with a particular communication protocol (e.g., User Datagram Protocol (UDP); Transmission Control Protocol (TCP); or Hypertext Transfer Protocol (HTTP)) that is selected by the communication protocol pre-filter to be routed to the communication protocol traffic subsystem for analysis. Throughout the specification and claims, the terms "object of interest" and "object under analysis" are used interchangeably.

The term "transmission medium" is a physical or logical communication path between two or more electronic devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the terms "detected" is used herein to represent that there is a prescribed level of confidence (or probability) on the presence of an exploit within an object under analysis. For instance, the logic of the static analysis engine "detects" a potential exploit by examining characteristics or features of an object under analysis, and, in response, determining whether the object has characteristics that suggest the object is an exploit and/or is associated with a malicious attack. This determination may be conducted through analysis as to whether there is at least a first probability that such characteristics exist. Likewise, the virtual execution logic detects the presence of an exploit by monitoring or observing unexpected or anomalous behaviors or activities of an object under analysis, and, in response, determining whether there is at least a second probability, perhaps higher than the first probability, that the object has characteristics indicative of an exploit, and thus, is associated with a malicious attack.

The term "computerized" generally represents that any corresponding operations are conducted by hardware in combination with software and/or firmware. Also, the term "comparison" generally means determining if a match (e.g., a certain level of correlation) is achieved between two items where one of the items may include a particular signature pattern.

The terms "binary" and "binaries" may be construed as executable code, commonly referred to as object or binary code. Examples of binaries may include, but are not restricted or limited to a compiled executable program.

Lastly, the terms "or" and "and/or" and "/" as used herein are to be interpreted as inclusive or meaning any one or any combination. Therefore, "A, B or C" or "A, B and/or C" mean "any of the following: A; B; C; A and B; A and C; B and C; A, B and C." Also, "A/B" represents "any of the following: A; B; A or B; A and B." An exception to this definition will occur only when a combination of elements or functions, are in some way inherently mutually exclusive.

As this invention is susceptible to embodiments of many different forms, it is intended that the present disclosure is to be considered as an example of the principles of the invention and not intended to limit the invention to the specific embodiments shown and described.

II. First Embodiment—TAC Comprising Static Analysis Engine Logic

A. Communication Flow

Referring to FIG. 1, an exemplary block diagram of a flow of network traffic within a networking system is shown. Herein, some or all of the incoming objects associated with monitored network traffic are received by network security device 104. The network security device 104 is configured to receive incoming objects over a communication network 101. Thereafter, the network security device 104 is configured to detect, using at least a static analysis and a dynamic analysis, which objects are to be flagged as including characteristics that suggest the object is an exploit and/or is associated with a malicious attack.

Herein, the network security device 104 may be communicatively coupled with the communication network 101 to monitor flows in a passive or active manner. In a passive manner, the network security device 104 may be communicatively coupled so as to capture and duplicate one or more objects associated with a flow propagating over a communication path 103. The duplicated copy is then analyzed while the original flow is passed to one or more client devices $105_1$-$105_M$ (M≥1), where one or more client devices may be simply represented as "client device(s)"). Such a network security device 104 is sometimes referred to as a "tap" or "network tap," which receives network traffic over communication path 103 between the communication network 101 and client device(s) $105_1$-$105_M$ (M≥1) and re-routes some or all of the network traffic to the network security device 104.

Alternatively, the network security device 104 may operate in an active manner with an in-line deployment, where the network traffic over the communication path 103 is directly received by the network security device 104. In other words, the network security device 104 is positioned between the communication network 101 and the client device(s) $105_1$-$105_M$ and analyzes objects within the original version of the network traffic. Subsequent to such analysis, for analyzed objects determined to be associated with a malicious attack, the objects may be precluded from being passed to the client device(s) $105_1$-$105_M$. Rather, the objects may be quarantined and perhaps held for further forensic analysis.

B. General Architecture

Figure 2:
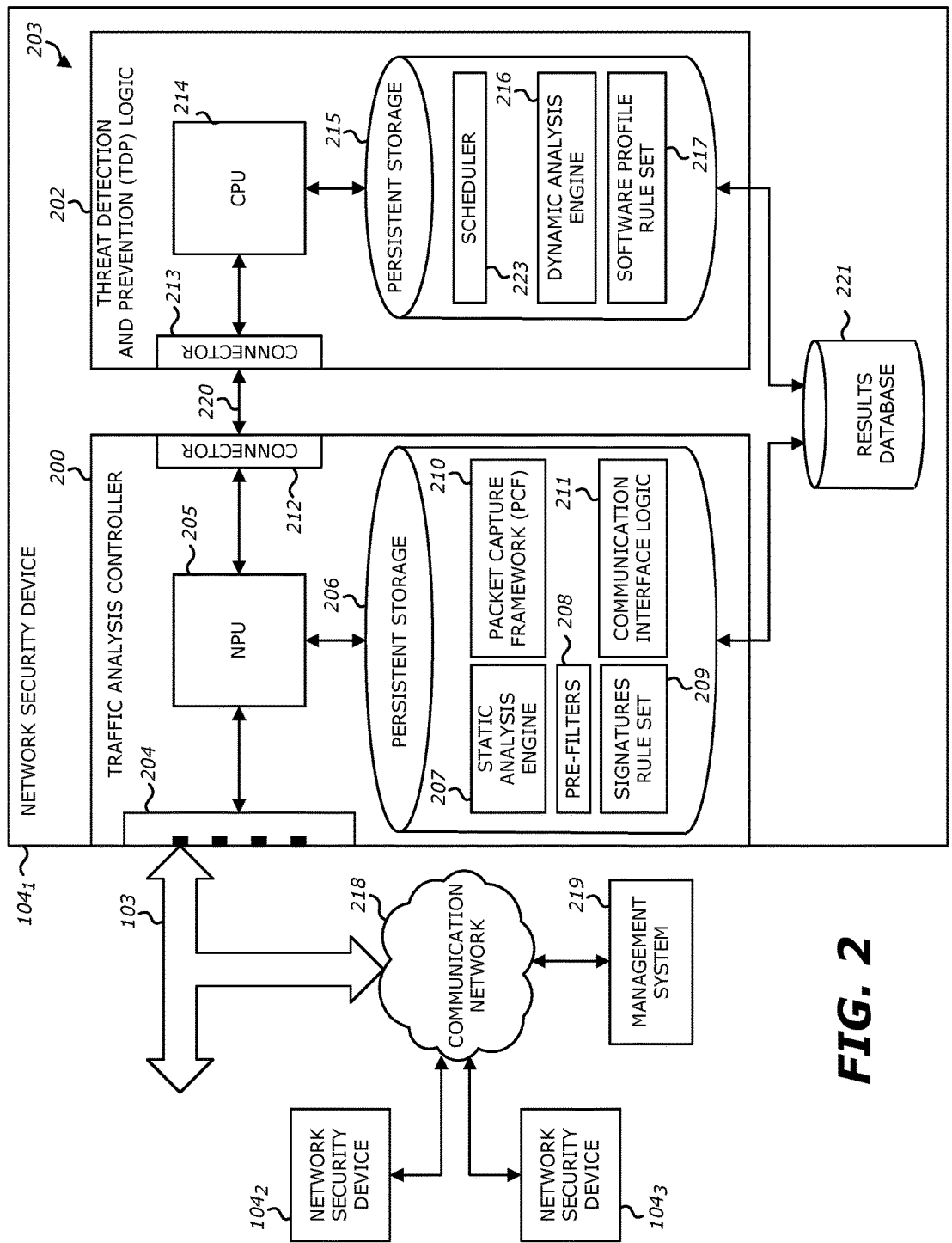
FIG. 2 is an illustration of an exemplary block diagram of a plurality of network security devices communicatively coupled to a management system via a network.

Referring to FIG. 2, an exemplary block diagram of a plurality of network security devices $104_1$-$104_N$ (N≥1, e.g., N=3) communicatively coupled to a management system 219 via a communication network 218 is shown. Communication network 218 may be configured as an intranet operating as a private network shared by the network security devices $104_1$-$104_3$ and management system 219 or communication network 218 may be configured as a public network such as the Internet for example.

In general, the management system 219 is adapted to manage network security devices $104_1$-$104_3$. For instance, the management system 219 may be responsible for automatically updating one or more exploit signatures and/or vulnerability signatures used by the static analysis engine 207 within some or all of network security devices $104_1$-$104_N$. Each of these signatures may represent a prior detected exploit or an uncovered software vulnerability. Such sharing may be conducted automatically or manually, e.g., uploaded by an administrator. Also, such sharing may be conducted without charge among the network security devices $104_1$-$104_3$ or subject to a paid subscription basis.

Herein, according to the embodiment illustrated in FIGS. 1 and 2, a first network security device $104_1$ is an electronic device that is adapted to analyze information associated with network traffic routed over the communication network 101 between at least one server device 100 and at least one client device $105_1$. The communication network 101 may include a public network such as the Internet, in which case an optional firewall (not shown) may be interposed prior to network security device 104 (e.g., first network security device). Alternatively, the communication network 101 may be a private network such as a wireless data telecommunication network, wide area network (WAN), a type of local area network (LAN), or a combination of networks.

As shown in FIG. 2, the first network security device $104_1$ comprises a traffic analysis controller 200 communicatively coupled to a host 203, which may include a TDP logic 202 (hereinafter, "TDP logic 202"). The traffic analysis controller 200 comprises communication ports 204; a network processing unit (NPU) 205 communicatively coupled to logic (e.g., software modules residing in persistent storage 206) to conduct packet processing and/or certain static analysis on objects associated with the received network traffic; and a connector 212. As shown, the persistent storage maintains several software modules including static analysis engine 207, a set of pre-filters 208, a signatures rule set 209, packet capture framework (PCF) 210, and/or communication interface logic 211. As shown, the communication ports 204 may be adapted to receive network traffic via path 103 so as to connect network security device $104_1$ to communications networks 101 and/or 218 while connector 212 provides a communication path to a connector 213 of the TDP logic 202 over transmission medium 220.

As shown, traffic analysis controller 200 and TDP logic 202 may reside within the same chassis housing of the network security device $104_1$. Of course, as described above, the network security device $104_1$ may implemented as a group of electronic devices in close physical proximity (e.g., rack of blade servers), where the traffic analysis controller $104_1$ may be deployed within a first electronic device while the TDP logic 202 is deployed within a second electronic device. For this deployment, the transmission medium 220 may include Twinaxial cabling, coaxial cabling, twisted pair cabling such as Category 5/5e/6/6a, or the like.

In general, the traffic analysis controller 200 operates as a data capturing device that is configured to receive data propagating to/from the client device(s) $105_1$-$105_M$ and provide at least some of this data to the packet capture framework (PCF) 210 of the network security device $104_1$. The traffic analysis controller 200 may provide at least some of the original network traffic to the PCF 210 or duplicate at least some of the network traffic and provide the duplicated copy to the PCF 210.

According to one embodiment of the disclosure, the static analysis engine 207 may be one or more software modules executed by a first processing unit while the dynamic analysis engine 216 may be one or more software modules executed on a second processing unit. The first and second processing units may be different processing units, where each "processing unit" may be a different physical processor located within the same processor package or at different physical locations, a different core processor within the same processor package, a different virtual processor, or the like. Of course, the first and second processing units may be the same physical/core/virtual processor.

As an example, as shown in FIG. 2, the static analysis engine 207, when deployed as one or more software modules, may be executed by the network processing unit (NPU) 205 being a processing unit for the traffic analysis controller 200 while the dynamic analysis engine 216 may be executed by a central processing unit (CPU) 214 being a processing unit for the host 203. The term "host" refers to any portion of the network security device 104 not included within the traffic analysis controller 200. Of course, it is contemplated that certain functionality of the static analysis engine 207 may be conducted by the host 203, such as the TDP logic 202 for example, and executed by the CPU 214. In this embodiment, the packet processing (e.g., pre-filtering) and/or certain static analysis functionality is off-loaded from the CPU 214 to the NPU 205 as described below and illustrated in FIG. 10.

In an embodiment in which the packet processing (e.g., processing of the set of pre-filters 208) and some or all of the processing of the static analysis engine 207 is off-loaded from the CPU 214 of the host 203 to the NPU 205 of the traffic analysis controller 200, a computational advantage arises. In particular, off-loading of the packet processing and/or at least some functionality by the static analysis engine 207 allows the CPU 214 to devote most of its resources to VM-based processing and subsequent monitoring. In this implementation, it is now possible to instantiate more VMs and/or run the analyses of the VMs for a longer time period as packet processing is not simultaneously requesting the resources of the CPU 214. Therefore, this logical configuration provides an ability to scale the processing of the network security device 104 by increasing the number of VMs used during the processing as well as potentially performing deep packet inspection and/or a static analysis on a processor separate from that which is executing the VMs.

1. Traffic Analysis Controller (TAC)

Figure 3:
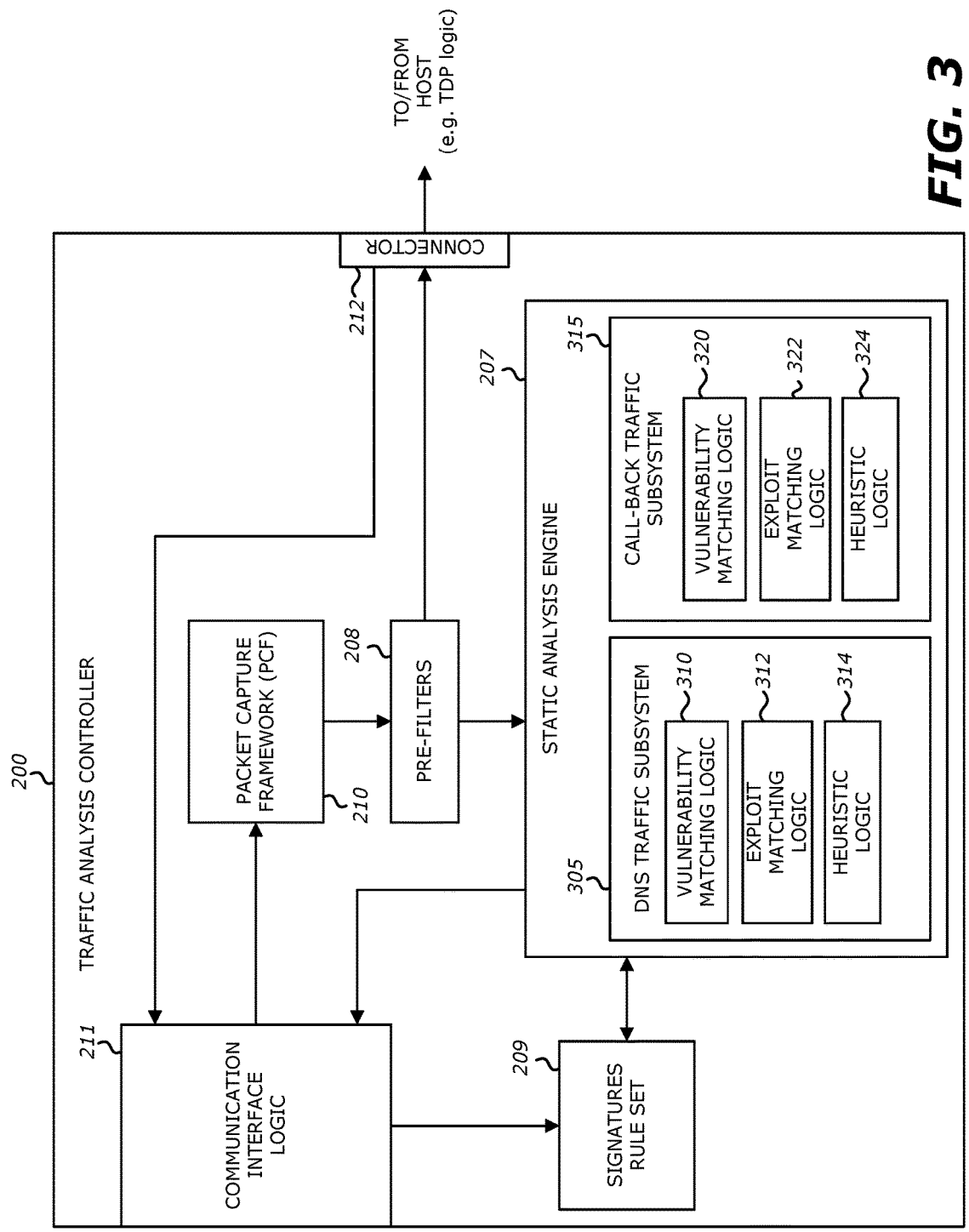
FIG. 3 is an illustration of an exemplary block diagram of logic associated with the traffic analysis controller (TAC) of a network security device.

Referring to FIG. 3, a block diagram of logic associated with the traffic analysis controller (TAC) 200 of the network security device $104_1$ is shown. As illustrated in FIGS. 2-3, the traffic analysis controller 200 comprises communication interface logic 211, packet capture framework (PCF) 210, pre-filters 208, signatures rule set 209, static analysis engine 207 and connector 212 which provides connectivity from the traffic analysis controller 200 to the threat detection and prevention (TDP) logic 203.

The PCF 210 controls the flow of the network traffic received by the network security device $104_1$. Specifically, the PCF 210 confirms that the network security device $104_1$ is operating properly according to the deployment scenario of the network security device 104. For instance, if the network security device $104_1$ is deployed off-line, or in a passive mode, the PCF 210 may be configured to ensure that the network security device $104_1$ receives a copy of the received network traffic and passes the copy of the received network traffic to the set of pre-filters 208 while the network traffic proceeds to one or more of the client device(s) $105_1$, . . . and/or $105_M$. In the off-line deployment scenario, the network security device $104_1$ does not block or delay the network traffic from reaching a client device (e.g., client device $105_1$) while the static and/or dynamic analysis is being performed. Alternatively, if the network security device $104_1$ is deployed in-line, the PCF 210 does not permit (blocks/halts) the received network traffic to pass through the network security device 104 to the client device $105_1$ until the network security device 104 has determined the received network security traffic does not contain malicious content once processing and analysis are complete. In the in-line deployment scenario, the PCF 210 ensures that the received network traffic passes to the client device $105_1$, after processing and analysis are complete, e.g., the network traffic does not contain malicious content.

The PCF 210 of the traffic analysis controller 200 is capable of receiving and routing objects associated with network traffic to the set of pre-filters 208. According to one embodiment of the disclosure, the set of pre-filters 208 comprise two or more filtering modules that perform an initial inspection of objects of received network traffic to determine the object type (e.g., the type of traffic associated with the object). In such an embodiment, one pre-filter is associated with objects to be routed to the static analysis engine 207 and another pre-filter may be associated with objects to be routed to the dynamic analysis engine 216 of FIG. 2.

Furthermore, each pre-filter is associated with a subsystem of either the static analysis engine 207 or the dynamic analysis engine 216 corresponding to the type of traffic for which the pre-filter is searching. For example, a pre-filter searching for communication protocol traffic may be associated with a communication protocol traffic subsystem deployed within the dynamic analysis engine 216. When a pre-filter determines that an object of the received network traffic is an object type of traffic for which the pre-filter is searching, the object is considered an "object of interest" and is routed from the pre-filter to the analysis engine subsystem with which the pre-filter is associated. When no pre-filter determines that the object is an object of interest, the object is permitted to pass to the client device $105_1$ without being routed to either the static analysis engine 207 or the dynamic analysis engine 216.

The set of pre-filters 208, located on the traffic analysis controller 200, may route an object of interest to a subsystem of the static analysis engine 207 located on the traffic analysis controller 200. Additionally or in the alternative, the set of pre-filters 208 may route objects of interest to a subsystem of the dynamic analysis engine 216 in the TDP logic 202 located within the host 203. The pre-filter that determines an object is of interest may provide the entire object or certain content within the object, for example, one or more objects that are part of one or more flows, packet payloads, or the like, to the corresponding analysis engine subsystem.

In some embodiments, an object of interest may be provided to the static analysis engine 207 and once the static analysis engine 207 has finished its analysis, a determination is made as to whether the object of interest may contain malicious content. Thereafter, the object of interest may not be provided to a subsystem within the dynamic analysis engine 216 for further in-depth analysis, but rather, information is provided to logic within the host 203 to initiate an alert message to a network administrator, user, or another entity regarding presence of a detected object having characteristics associated with a malicious attack. For instance, a call-back traffic subsystem 315 of FIG. 3 may perform such operations upon detecting a call-back condition. Alternatively, in other embodiments, an object of interest may be provided to the static analysis engine 207, analyzed and then provided to the dynamic analysis engine 216 for further analysis prior to the network security device 104 making a determination as to whether the object of interest has characteristics that suggest the object is an exploit and/or is associated with a malicious attack. For instance, a domain name system (DNS) subsystem 305 of FIG. 3 may perform such operations.

Figure 4:
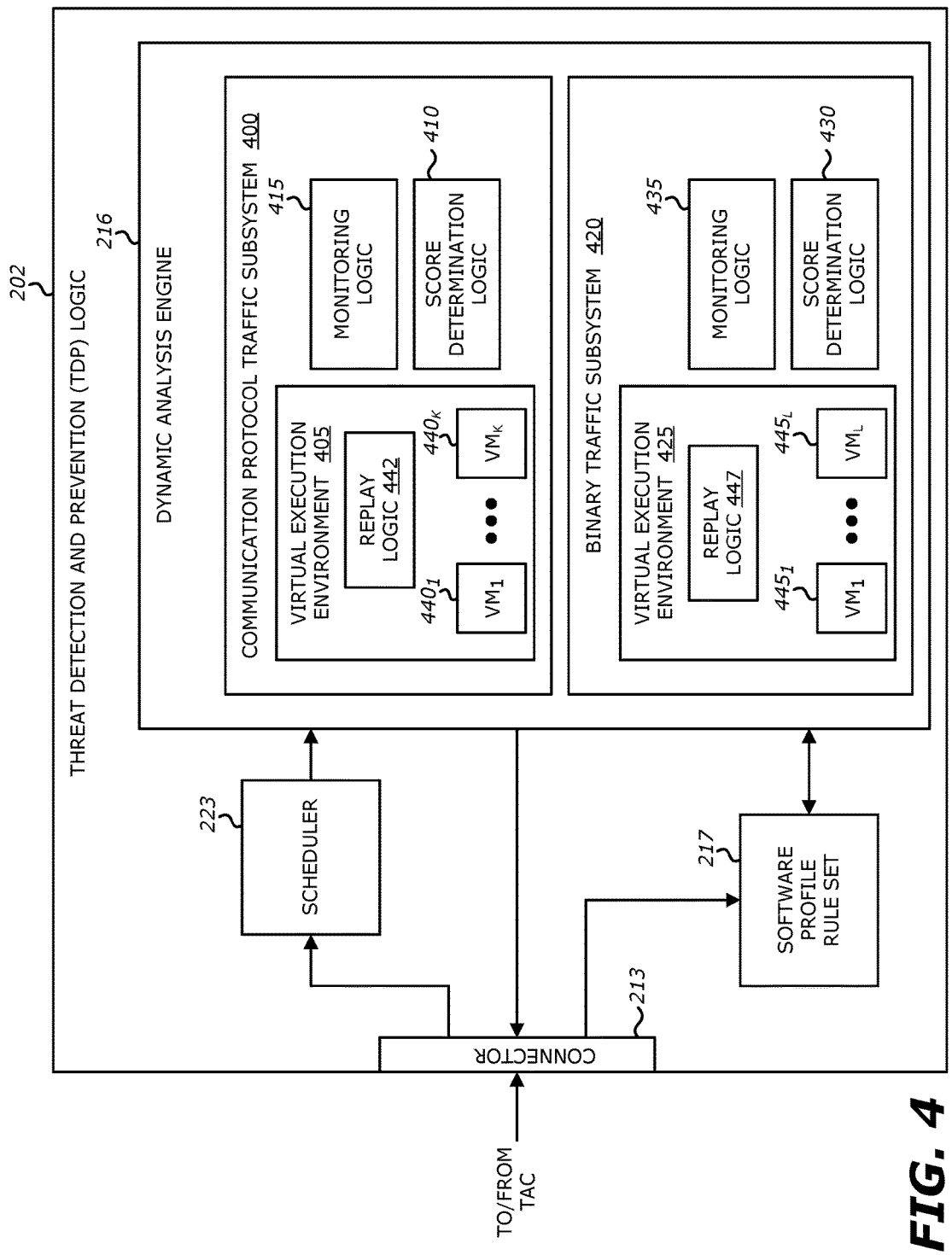
FIG. 4 is an illustration of an exemplary block diagram of logic associated with the threat detection and prevention (TDP) logic of the host included within a network security device.

In one embodiment of the disclosure, as illustrated in FIGS. 3-4, the set of pre-filters 208 may comprise four pre-filters searching for four types of traffic, including: (1) DNS traffic; (2) traffic containing call-back activity; (3) communication protocol traffic; and (4) traffic containing at least one binary. In such an embodiment, the four pre-filters correspond to the following subsystems of the static analysis engine 207 or the dynamic analysis engine 216: (1) DNS traffic subsystem 305, (2) call-back traffic subsystem 315, (3) communication protocol traffic subsystem 400, and/or (4) binary traffic subsystem 420. Furthermore, the set of pre-filters 208 are located on the traffic analysis controller 200 along with the static analysis engine 207.

In the embodiment, the static analysis engine 207 comprises the DNS traffic subsystem 305 and the call-back traffic subsystem 315. The dynamic analysis engine 216, located on the host 203, comprises the communication protocol traffic subsystem 400 and the binary traffic subsystem 420 as shown in FIG. 4.

In an alternative embodiment, the functions of the communication protocol traffic subsystem 400 and the binary traffic subsystem 420 may be incorporated into a single subsystem on the dynamic analysis engine 216 while the functions of the DNS traffic subsystem 305 and the call-back traffic subsystem 315 are incorporated into a single subsystem on the static analysis engine 207.

Referring to FIGS. 2 and 3, the DNS traffic subsystem 305 and the call-back traffic subsystem 315, when executed on one or more processors, may be configured to perform static analysis on a particular object, such as exploit signature checks and/or vulnerability signature checks by exploit matching logic 312/322 and/or vulnerability matching logic 310/320 for example. Such signature check operations may involve accessing pre-stored signatures from signature rules set 209 stored on one or more non-transitory storage mediums such as persistent storage 206.

In general, the DNS traffic subsystem 305 and the call-back traffic subsystem 315 of the static analysis engine 207 are communicatively coupled to receive one or more objects within network traffic which may be related or unrelated to each other. For instance, one object may be a series of packets containing one or more requests to a DNS server operating as a flow routed over communication network 101. The subsystems of the static analysis engine 207 comprise logic which analyzes each of the objects for known exploits using exploit signatures and, for the protocol activity, using vulnerability signatures. For instance, the exploit matching logic 312/322 within the DNS traffic subsystem 305 and the call-back traffic subsystem 315 performs exploit signature checks, which may involve a comparison of one or more pre-stored exploit signatures (pre-configured and pre-determined attack patterns against the object of interest) from signatures rule set 209.

Additionally, the DNS traffic subsystem 305 and the call-back traffic subsystem 315 of the static analysis engine 207 may comprise heuristic logic 314/324 which analyzes each of the objects using metadata or attributes of the object of interest to determine whether a certain portion of the object has characteristics that suggest the object is an exploit and/or is associated with a malicious attack. For instance, the heuristic logic 314/324 may analyze the object of interest to determine whether certain portions of the object corresponds to one or more "malicious identifiers," which may include, but are not limited or restricted to a particular source or destination address (e.g., URLs, IP addresses, MAC addresses, etc.) that is associated with known exploits; exploit patterns; or even shell code patterns.

Upon detecting a match during the exploit signature check, vulnerability signature check and/or the heuristic check (an object under analysis has characteristics that suggest the object is an exploit and/or is associated with a malicious attack), the static analysis engine 207 may be adapted to upload the static analysis results for storage in results database 221. These results may include, but are not limited or restricted to (i) an exploit identifier such as a particular name/family of the suspected exploit (if known); (ii) source address (e.g., Uniform Resource Locator "URL", Internet Protocol "IP" address, etc.) of a source of the suspect object; (iii) time of analysis; and/or (iv) information associated with anomalous characteristics pertaining to the object of interest.

According to another embodiment of the disclosure, the PCF 210 may be further configured to capture metadata from network traffic intended for client device $105_1$. According to one embodiment, the metadata may be used, at least in part, by the heuristic logic 314/324 and/or to determine protocols, application types and other information that may be used by logic within the network security device $104_1$ to determine particular software profile(s). The software profile(s) are used for selecting and/or configuring a run-time environment in one or more virtual machines selected or configured as part of the dynamic analysis engine 216, as described below. These software profile(s) may be directed to different versions of the same software application for fetching corresponding software image(s) from profile software rule set 217.

Furthermore, according to one embodiment of the disclosure, packet processing and static analysis operations are off-loaded to the traffic analysis controller 200 while VM-based processing remains on the host 203. Herein, the VM-based analysis normally requires significantly more computing resources, including both CPU and memory, which may be best provided by the host 203 (e.g., main system) than within a NIC deployment of the traffic analysis controller 200. Hence, the static analysis engine 207 may be adapted to route information that is used by the scheduler 213, dynamic analysis engine 216 and/or reporting logic (not shown) to conduct further analysis as to whether the suspect object is associated with a malicious attack (e.g., an exploit). This information may include, but is not limited or restricted to (1) the suspect object, (2) anomalous characteristics of the suspect object, based on signature matching, heuristics and other static analysis, that may indicate the presence of an exploit; (3) a score generated to classify a threat level of the suspect object being a possible exploit 2. Threat Detection and Prevention (TDP) Logic Referring to FIG. 4, a block diagram of logic associated with the threat detection and prevention (TDP) logic of the host (hereinafter, "TDP logic 202") included within the network security device $104_1$ is shown. As illustrated, the TDP logic 202 comprises dynamic analysis engine 216, software profile rule set 217, a scheduler 223 and a second connector 213. The second connector 213 enables the TDP logic 202 to exchange data with the traffic analysis controller 200 over transmission medium 220. The communication protocol traffic subsystem 400 and the binary traffic subsystem 420 of the dynamic analysis engine 216 include virtual execution environments 405/425, score determination logic 410/430 and monitoring logic 415/435. The virtual execution environments 405/425 is comprised of one or more virtual machines (VMs) $440_1$-$440_K$ (K≥1) and $445_1$-$445_L$ (L≥1).

In general, at least one pre-filter of the set of pre-filters 208 located on the traffic analysis controller 200 provides the objects of interest to the dynamic analysis engine 216 for in-depth dynamic analysis using virtual machines (VMs) $440_1$-$440_K$ or $445_1$-$445_L$. For instance, the communication protocol traffic subsystem 400 may simulate transmission and/or receipt by a destination device comprising the virtual machine.

According to one embodiment, one or more VMs $440_1$-$440_K$ or $445_1$-$445_L$ within the virtual execution environments 405/425 may be configured with all of the software profiles corresponding to the software images stored within software profile rule set 217. Alternatively, the VMs $440_1$-$440_K$ or $445_1$-$445_L$ may be configured according to a prevalent software configuration, software configuration used by an electronic device within a particular enterprise network (e.g., client device $105_1$), or an environment that is required for the object to be processed, including software such as a web browser application, PDF reader application, or the like. However, for a known or recognized vulnerability, the VMs $440_1$-$440_K$ or $445_1$-$445_L$ may be more narrowly configured to software profiles associated with vulnerable software.

As previously stated and shown in FIGS. 3-4, one embodiment of the set of pre-filters comprises four pre-filters 208 searching for four types of traffic, including: (1) DNS traffic; (2) traffic containing call-back activity; (3) communication protocol traffic; and (4) traffic containing at least one binary. These four pre-filters 208 also correspond to the following analysis engine subsystems: (1) DNS traffic subsystem 305, (2) call-back traffic subsystem 315, (3) communication protocol traffic subsystem 400, and (2) binary traffic subsystem 420. Furthermore, the dynamic analysis engine 216, located on the TDP logic 202 of the host 203, comprises the communication protocol traffic subsystem 400 and the binary traffic subsystem 420.

Upon receiving an object of interest from pre-filters 208, the scheduler 223 may determine which software image(s) are associated with software having the vulnerability. In one embodiment, the determination may be based on the static analysis conducted by the static analysis engine 207. Thereafter, the software profile(s) are selected by the scheduler 223 to fetch these software image(s) for configuration of VM $440_1$ or $445_1$. This tailored selection scheme avoids VM configuration for software that does not feature the matched software vulnerability.

As a second illustrative example, the scheduler 223 may be adapted to configure the multiple VMs $440_1$-$440_K$ for concurrent virtual execution of a variety of different versions of the software in efforts to determine whether the object of interest identified by the communication protocol traffic subsystem 400 and the binary traffic subsystem 420 is an exploit.

Of course, it is contemplated that the VM configuration described above may be handled by logic other than the scheduler 223. For instance, although not shown, the dynamic analysis engine 216 may include configuration logic that is adapted to determine which software image(s) are associated with software having the vulnerability. The vulnerability may be uncovered by the static analysis engine 207. This configuration logic may transmit the VM configuration information to the scheduler 223 to handle VM configuration as described above; alternatively, the dynamic analysis engine 216 may exclusively handle the VM configuration.

According to one embodiment of the disclosure, the communication protocol traffic subsystem 400 is adapted with the virtual execution environment 405 to execute one or more VMs $440_1$-$440_K$ that, operating in combination with a protocol sequence replayer (replay logic) 442, simulates the receipt and execution of an object of interest within a run-time environment as expected for the type of object. Similarly, the binary traffic subsystem 420 is adapted with the virtual execution environment 425 to execute one or more VMs $445_1$-$445_L$ that, operating in combination with a protocol sequence replayer (replay logic) 447, simulates the receipt and execution of an object of interest within a run-time environment as expected for objects including binaries.

As an illustrative example, the communication protocol traffic subsystem 400 may conduct virtual processing of an object of interest (e.g., a HTTP communication session) and provide the object of interest to the VM(s) $440_1$, . . . , and/or $440_K$. The replay logic 442 within the communication protocol traffic subsystem 400 may be adapted to provide, and sometimes modify (e.g. modify IP address) packets associated with the objects of interest containing one or more objects containing Internet traffic and synchronize any return network traffic generated by the virtual execution environment 405 in response to the packets. Hence, the communication protocol traffic subsystem 400 may suppress (e.g., discard) the return network traffic such that the return network traffic is not transmitted to the communication network 101. For instance, for a particular suspect object being a flow such as a TCP or UDP sequence, the replay logic 442 may replay the data packets by sending packets to the virtual execution environment 405 via a TCP connection or UDP session. Furthermore, the replay logic 442 may synchronize return network traffic by terminating the TCP connection or UDP session.

As another illustrative example, the binary traffic subsystem 420 may conduct virtual processing of an object of interest (e.g., a binary extracted from network traffic) and provide the object of interest to the VM(s) $445_1$, . . . , and/or $445_L$. The replay logic 447 within the binary traffic subsystem 420 may be adapted to return information to the VM(s) $445_1$, . . . , and/or $445_L$ in the event that the binary requests information from remote sources.

As further shown in FIG. 4, the monitoring logic 415/435 within the dynamic analysis engine 216 may be configured to monitor behavior of the object being processed by one or more VMs $440_1$, . . . , and/or $440_K$ or $445_1$, . . . , and/or $445_L$, for detecting anomalous or unexpected activity indicative of an exploit. If so, the object may be determined as being associated with malicious activity, and thereafter, monitoring logic 415/435 operating with score determination logic 410/430 may route the VM-based results (e.g., computed score, information associated with the detected anomalous behaviors, and other information associated with the detected malicious activity by the suspect object) to results database 221 of FIG. 2.

According to one embodiment of the disclosure, the score determination logic 410/430 comprises one or more software modules that are used to determine a probability (or level of confidence) that the object of interest is an exploit. Score determination logic 410/430 is configured to generate a value (referred to as a "score") that classifies the threat of the possible exploit. Of course, a score may be assigned to the suspect object as a whole by mathematically combining the scores determined by analysis of different content associated with the same object of interest to obtain an overall score for that object of interest.

When the static analysis results or the VM-based results indicate that the object of interest under analysis contains malicious content, as shown in FIG. 1, the object may be held within the network security device $104_1$ and not permitted to pass to one or more of the client devices $105_1$, . . . and/or $105_M$. Alternatively, the object may be permitted to pass to one or more of the client devices $105_1$, . . . and/or $105_M$, where further monitoring of the object may take place. Furthermore, in either case, an administrator may be alerted to the presence of an object containing malicious content. Such an alert may be issued (e.g., by email or text message) to security administrators for example, communicating the urgency in handling one or more objects containing at least characteristics that suggest the object is an exploit and/or is associated with a malicious attack. An issued alert may also provide a designation of a selected threat level of the one or more objects containing at least characteristics indicative of malicious content.

Of course, in lieu of or in addition to static scanning operations being conducted by network security devices $104_1$-$104_3$, it is contemplated that cloud computing services 102 may be implemented with static analysis engine 207 to perform the exploit and/or vulnerability signature checks and/or with dynamic analysis engine 216 to conduct virtual execution on content within the object of interest, as described herein. In accordance with this embodiment, network security device $104_1$ may be adapted to establish secured communications with cloud computing services 102 of FIG. 1 for exchanging information.

C. Flow of Objects Through TAC, Pre-Filters and Analysis Engine Subsystems

Figure 5:
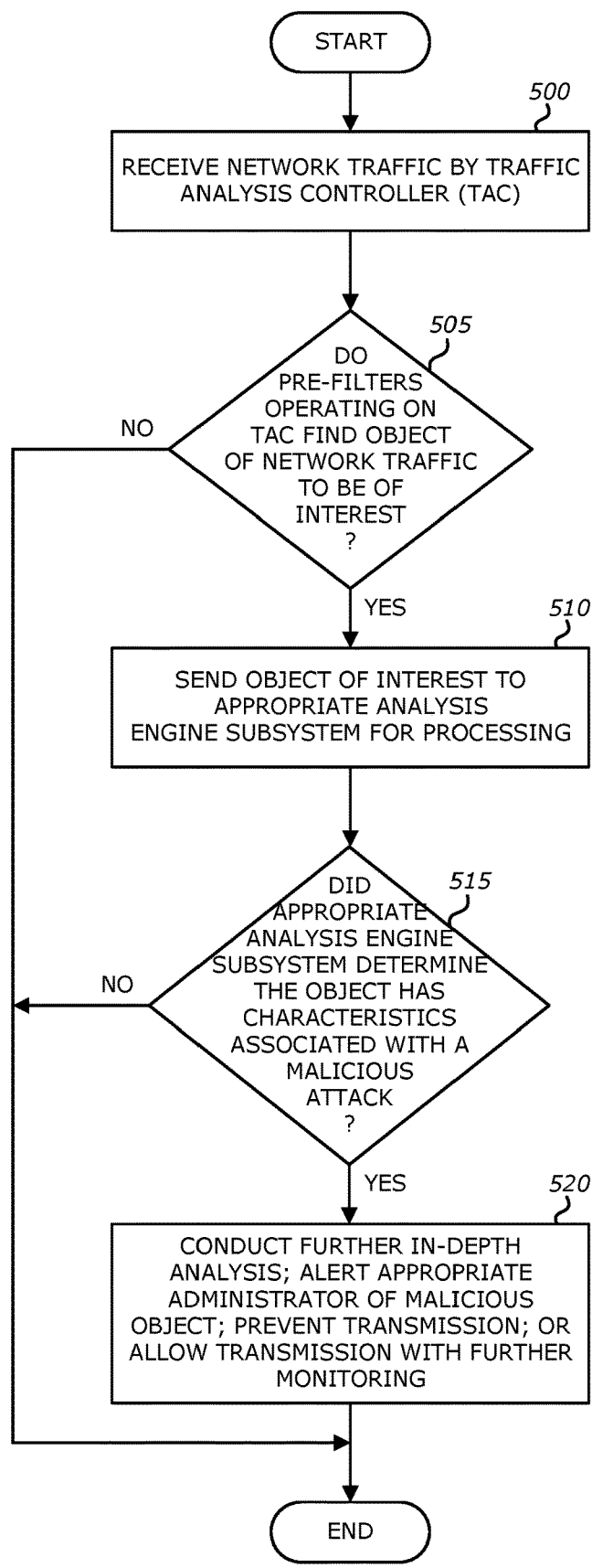
FIG. 5 is an exemplary diagram of a flowchart illustrating operations of a network security device.

Referring to FIG. 5, an exemplary diagram of a flowchart illustrating operations of a network security device determining whether an object of received network traffic requires analysis by an analysis engine subsystem is shown.

The traffic analysis controller (TAC) 200 of the network security device 104₁ of FIG. 2 receives network traffic (block 500). Thereafter, a set of pre-filters operating on the traffic analysis controller perform an initial inspection of an object within the received network traffic to determine whether the object is an object of interest (block 505). This may be conducted through analysis of the object type.

If none of the pre-filters within the set of pre-filters finds the object to be an object of interest (e.g., the type of object under analysis is not recognized by the pre-filters), the network security device may allow the object, and associated packets or flows if applicable, to pass to the client device without further analysis (NO at block 505). However, if a pre-filter finds the object to be an object of interest, such as the object contains traffic of the type for which the pre-filter is searching for example (YES at block 505), the object of interest may be routed to the appropriate analysis engine subsystem for further processing (block 510).

Upon receiving the object of interest, the appropriate analysis engine subsystem performs processing to determine whether the object of interest includes malicious content so as to constitute an exploit (block 515). If the appropriate analysis engine subsystem determines that the object of interest does not have characteristics associated with a malicious attack (e.g., not an exploit), the network security device may allow the object (e.g., associated packet(s) or flows) to pass to the client device (NO at block 515). However, if the appropriate analysis engine subsystem determines that the object has characteristics associated with a malicious attack (YES at block 515), the network security device may (1) conduct further in-depth analysis (e.g., DNS subsystem determines object is suspicious and further analysis by the dynamic analysis engine is warranted); (2) optionally alert the appropriate administer or security technician of the presence of malicious content, (3) prevent the transmission of the object, and possibly any packets or flows associated with the object, or (4) allow transmission of the object and perform further monitoring (block 520).

Figure 6:
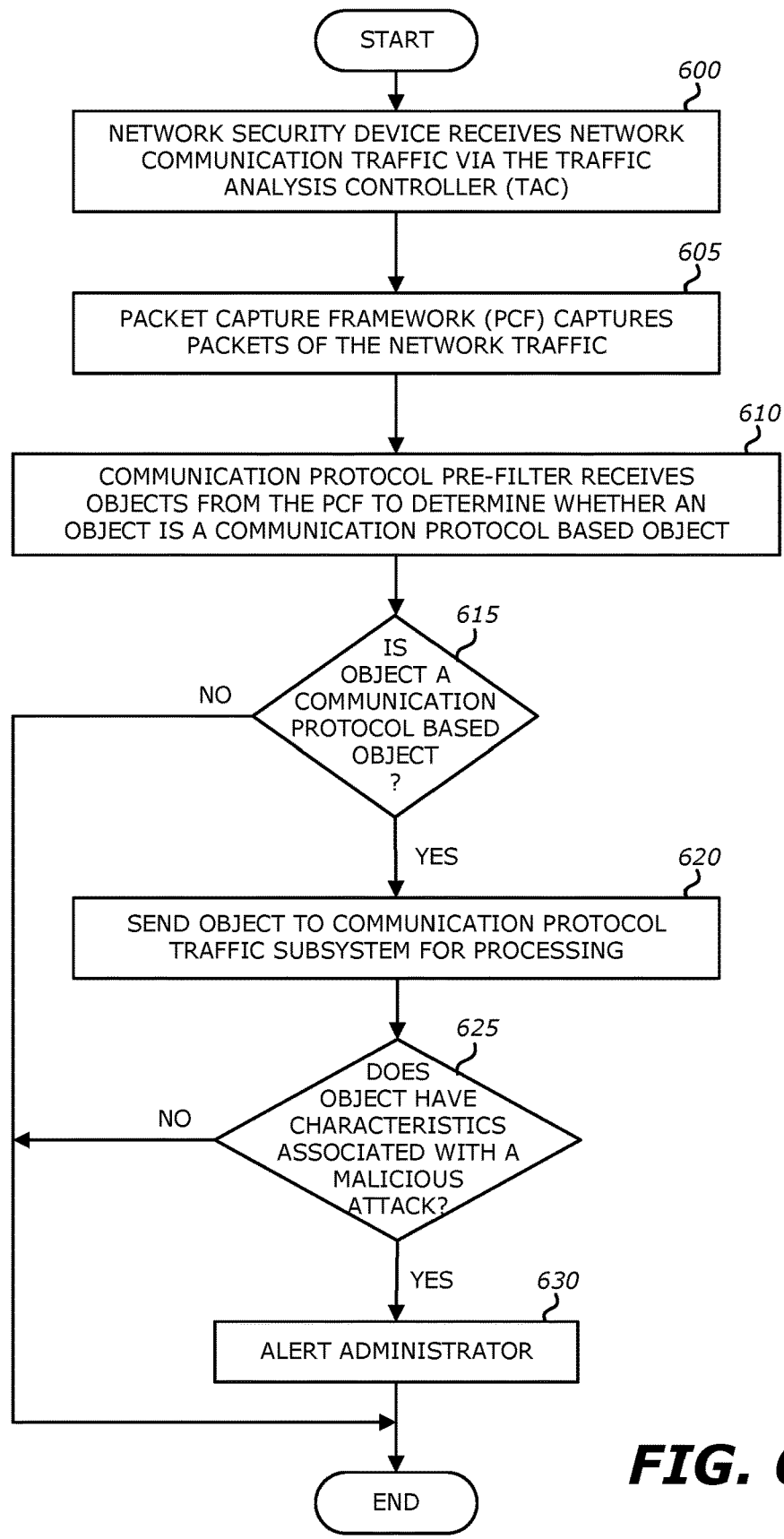
FIG. 6 is an exemplary diagram of a flowchart illustrating operations of a network security device determining whether an object of received network traffic requires analysis by a communication protocol analysis engine subsystem.

Referring to FIG. 6, an exemplary diagram of a flowchart illustrating operations of a network security device determining whether an object of received network traffic requires analysis by a communication protocol traffic subsystem is shown. The network security device receives network traffic via the traffic analysis controller (block 600). Thereafter, a packet capture framework (PCF) captures packets of the received network traffic (block 605).

The PCF then sends objects of the received network traffic to the communication protocol pre-filter and the communication protocol pre-filter determines whether the object is a communication protocol-based object (block 610). For instance, the communication protocol pre-filter may inspect an object searching for an Internet Protocol (IP) packet comprising a header and a payload. In one embodiment, if an object inspected by the communication protocol pre-filter is determined to contain an IPv4 or an IPv6 packet, the communication protocol pre-filter will designate the object as an object of interest and forward the object, and possibly any associated packets or flows, to the communication protocol analysis engine subsystem. As another example, the communication protocol pre-filter may designate as objects of interest any object containing packets or data transferred using various communication protocols such as, but not limited or restricted to, transmission control protocol (TCP), user datagram protocol (UDP), dynamic host configuration protocol (DHCP), hypertext transfer protocol (HTTP) or file transfer protocol (FTP).

If the object is not determined to be a communication protocol based object, the network security device may allow the object, and associated packets or flows if applicable, to pass to the client device (NO at block 615). However, if the object is determined to be a communication protocol based object, i.e., an object of interest to the communication protocol pre-filter, (YES at block 615), the object is routed from the communication protocol pre-filter to the communication protocol traffic subsystem (of the dynamic analysis engine 216) for processing (block 620).

In one embodiment, as the communication protocol traffic subsystem is located within the dynamic analysis engine, the processing of the communication protocol traffic subsystem includes VM-based processing of the objects of interest. Such dynamic analysis may include virtual execution of the content of the object of interest. In particular, one or more VMs of the virtual execution environment of the communication protocol traffic subsystem may simulate loading of packets within an object of interest. The monitoring logic monitors what particular content is loaded and/or requested by the object of interest. For instance, the VM(s) may simulate the loading of an object of interest while the monitoring logic monitors for anomalous behavior such as repeated attempts to load the same HTTP address.

If, based on the processing by the communication protocol analysis engine, the object of interest is not determined to have characteristics that suggest the object is an exploit and/or is associated with a malicious attack, the network security device may allow the object, and associated packets or flows if applicable, to pass to the client device (NO at block 625). However, if the object of interest is determined to have characteristics that suggest the object is an exploit and/or is associated with a malicious attack (YES at block 625), the network security device may optionally alert the appropriate administer or security technician of the presence of malicious content (block 630), prevent the transmission of the object, and possibly any packets or flows associated with the object, or allow transmission of the object and perform further monitoring.

Figure 7:
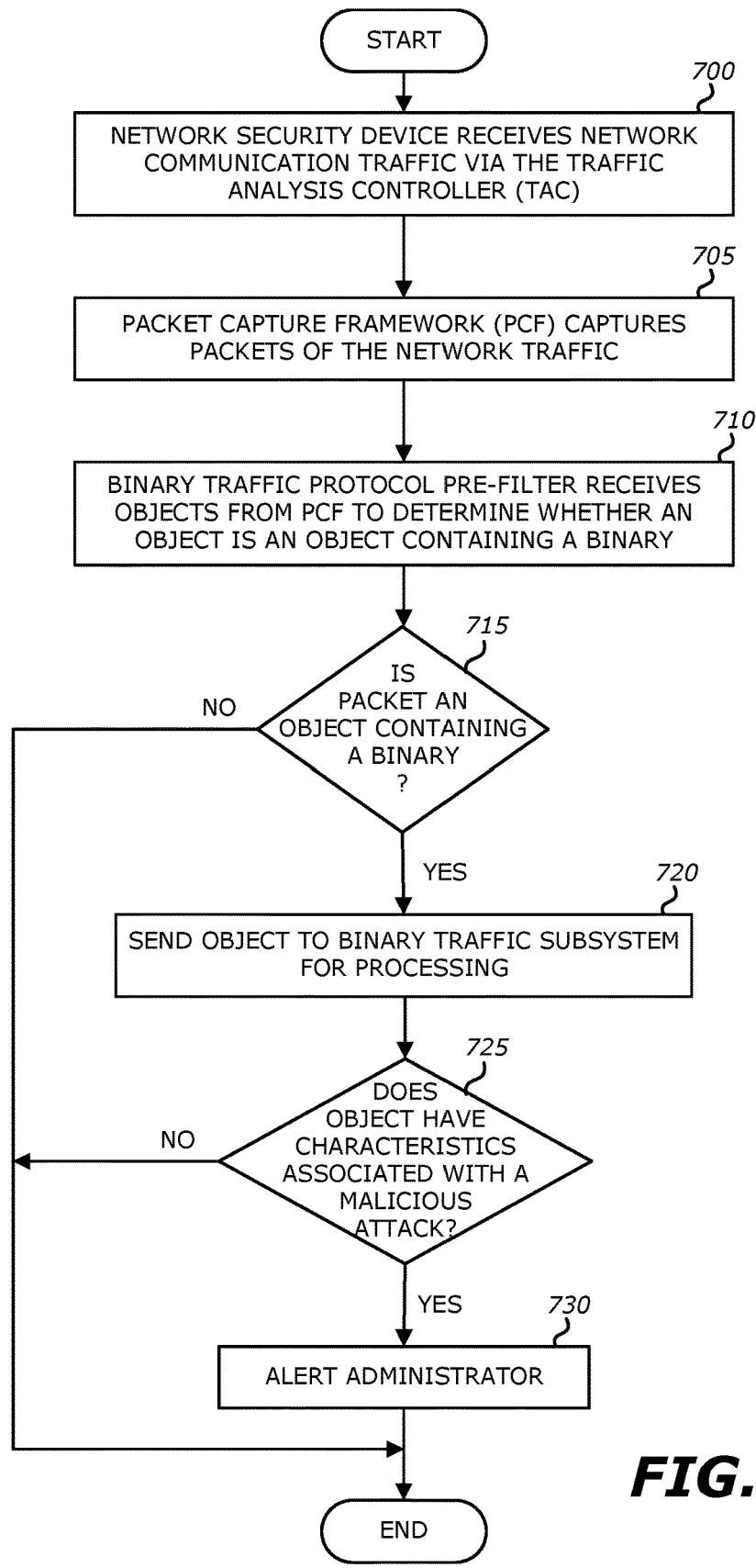
FIG. 7 is an exemplary diagram of a flowchart illustrating operations of a network security device determining whether an object of received network traffic requires analysis by a binary traffic subsystem

Referring to FIG. 7, an exemplary diagram of a flowchart illustrating operations of a network security device determining whether an object of received network traffic requires analysis by a binary traffic subsystem is shown. The network security device receives network traffic via the traffic analysis controller (block 700). Thereafter, a packet capturing framework (PCF) captures packets of the received network traffic (block 705).

The PCF then routes objects of the received network traffic to the binary traffic pre-filter and the binary traffic pre-filter determines whether the object is an object containing a binary (block 710). For instance, the binary traffic pre-filter may inspect an object searching for one or more packets indicating the presence of a binary within the object or flow. In particular, the binary traffic pre-filter may inspect the payload of a network packet to determine whether particular data is present in the payload. Alternatively, the binary traffic pre-filter may determine the presence of particular data in the payload through inspection of the header of a network packet.

If the object is not determined to be an object containing a binary, the network security device may allow the object, and associated packets or flows if applicable, to pass to the client device (NO at block 715). However, if the object is determined to be an object containing a binary, such as an object of interest to the binary traffic pre-filter, (YES at block 715), the object of interest is routed, from the binary traffic pre-filter, to the binary traffic subsystem (of the dynamic analysis engine 216) for processing (block 720).

In one embodiment, as the binary traffic subsystem is located within the dynamic analysis engine, the processing of the binary traffic subsystem includes VM-based processing of the objects of interest. Such dynamic analysis may include virtual execution of the content of the object of interest. In particular, one or more VMs of the virtual execution environment of the binary traffic subsystem may simulate loading of packets within an object of interest. The monitoring logic monitors what particular content is loaded and/or requested by the object of interest. For instance, VM may simulate the execution or loading of a file, such as a PDF file, located within an object of interest while monitoring logic monitors for anomalous behavior that deviates from expected behavior present when executing or loading such a file.

If, based on the processing by the binary traffic subsystem 420, the object of interest is not determined to have characteristics that suggest the object is an exploit and/or is associated with a malicious attack, the network security device may allow the object, and associated packets or flows if applicable, to pass to the client device (NO at block 725). However, if the object of interest is determined to have characteristics that suggest the object is an exploit and/or is associated with a malicious attack (YES at block 725), the network security device may optionally alert the appropriate administer or security technician of the presence of malicious content (block 730), prevent the transmission of the object, and possibly any packets or flows associated with the object, or allow transmission of the object and perform further monitoring.

Figure 8:
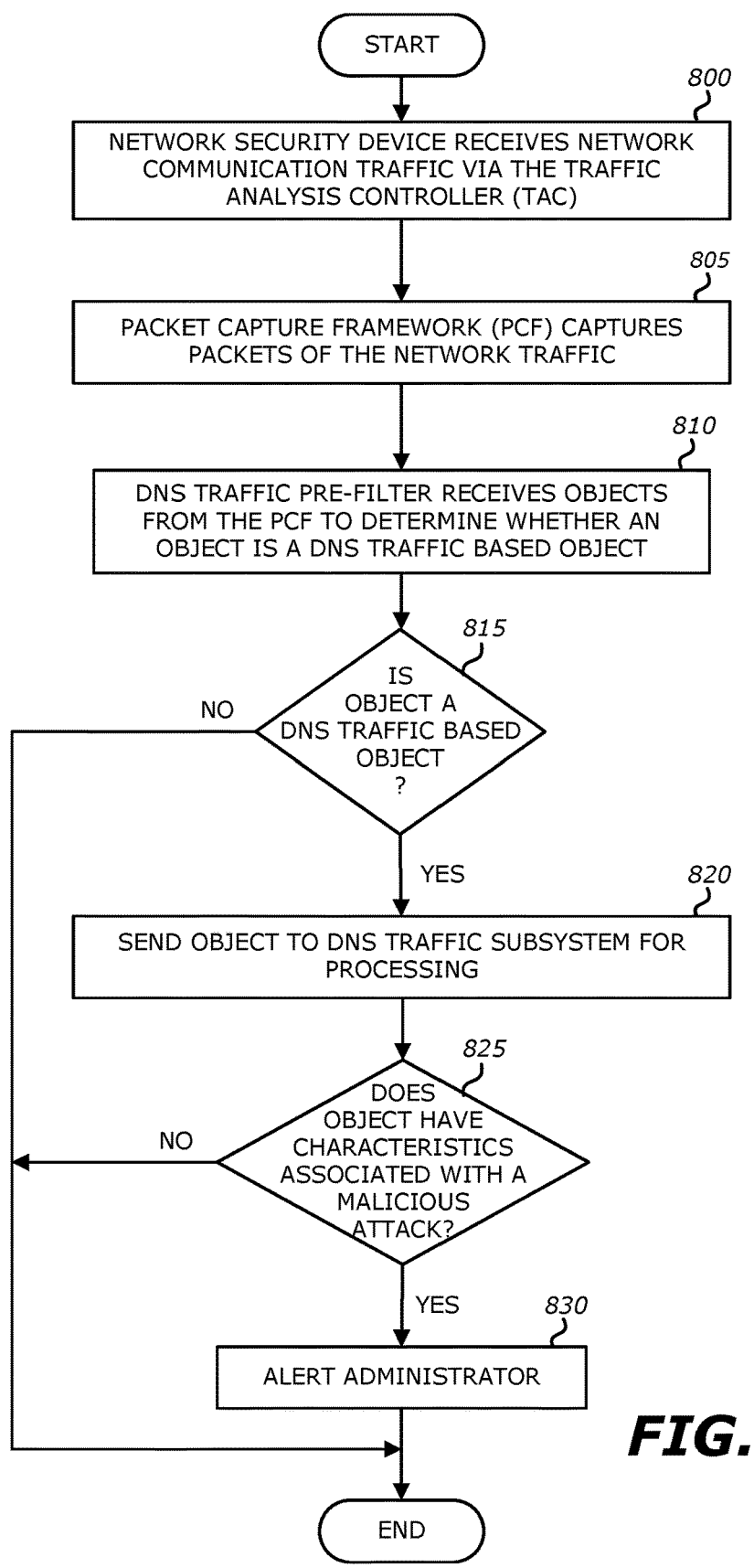
FIG. 8 is an exemplary diagram of a flowchart illustrating operations of a network security device determining whether an object of received network traffic requires analysis by a DNS traffic subsystem.

Referring to FIG. 8, an exemplary diagram of a flowchart illustrating operations of a network security device determining whether an object of received network traffic requires analysis by a DNS traffic subsystem is shown. The network security device receives network traffic via the traffic analysis controller 200 (block 800). Thereafter, a packet capture framework (PCF) captures packets of the received network traffic (block 805). In particular, the DNS traffic pre-filter may designate an object containing a DNS query as an object of interest.

The PCF then routes objects of the received network traffic to the communication protocol pre-filter and the DNS traffic pre-filter determines whether the object is an object containing DNS traffic (block 810). For instance, the DNS traffic pre-filter may inspect an object that contains data structures and communication exchanges adhering to the DNS protocol which is a protocol typically used with exchanges over the Internet.

If the object is not determined to be an object containing DNS traffic, the network security device may allow the object, and associated packets or flows if applicable, to pass to the client device (NO at block 815). However, if the object is determined to be an object containing DNS traffic, i.e., an object of interest to the DNS traffic pre-filter, (YES at block 815), the object of interest is routed, from the DNS traffic pre-filter, to the DNS traffic subsystem (of the static analysis engine 207) for processing (block 820).

In one embodiment, as the DNS traffic subsystem is located within the static analysis engine, the processing of the DNS traffic subsystem includes deep-packet inspection (DPI) and/or performance of a static analysis using at least exploit signature checks, vulnerability signature checks and/or heuristic checks on the objects of interest. In particular, the exploit matching logic within DNS traffic subsystem may perform a comparison of one or more pre-stored exploit signatures from signatures rule set with the object of interest. In particular, the DNS traffic subsystem may perform a heuristic analysis to determine whether the object of interest contains anomalous content such as repeated queries to a DNS server.

If, based on the processing by the DNS traffic subsystem, the object of interest is not determined to have characteristics that suggest the object is an exploit and/or is associated with a malicious attack, the network security device may allow the object, and associated packets or flows if applicable, to pass to the client device (NO at block 825). However, if the object of interest is determined to have characteristics that suggest the object is an exploit and/or is associated with a malicious attack (YES at block 825), the network security device may optionally alert the appropriate administer or security technician of the presence of malicious content (block 830), prevent the transmission of the object, and possibly any packets or flows associated with the object, or allow transmission of the object and perform further processing such as VM-based processing within the dynamic analysis engine.

Figure 9:
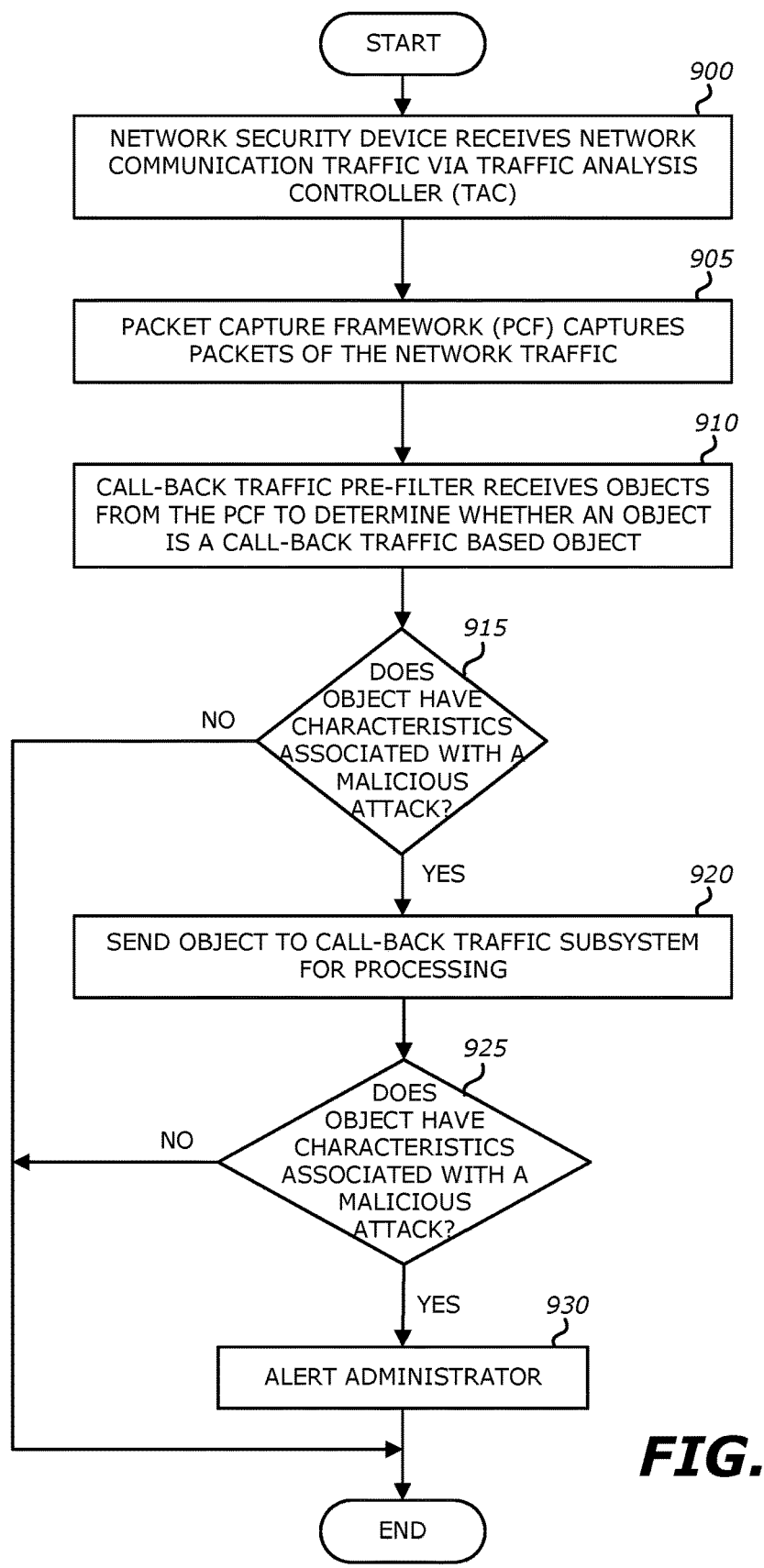
FIG. 9 is an exemplary diagram of a flowchart illustrating operations of a network security device determining whether an object of received network traffic requires analysis by a call-back traffic subsystem.

Referring to FIG. 9, an exemplary diagram of a flowchart illustrating operations of a network security device determining whether an object of received network traffic requires analysis by a call-back traffic subsystem is shown. The network security device receives network traffic via the traffic analysis controller (block 900). Thereafter, a packet capture framework (PCF) captures packets of the received network traffic (block 905).

The PCF then routes objects of the received network traffic to the call-back traffic pre-filter and the call-back traffic pre-filter determines whether the object is an object containing call-back traffic (block 910). For instance, the call-back traffic pre-filter may inspect an object searching for content containing a call or query to a specific IP address.

In one embodiment, the call-back traffic pre-filter may pass a number of the first packets of every object or flow to the call-back traffic subsystem. In such an embodiment, the call-back traffic subsystem determines whether a call-back will be made by the object or flow from the first few packets of the object or flow. The number of first packets of an object or flow passed to the call-back traffic subsystem is a variable number and may be, for instance, the first five or ten packets of every object or flow within the received network traffic.

If the object is not determined to be an object containing call-back traffic, the network security device may allow the object, and associated packets or flows if applicable, to pass to the client device (NO at block 915). However, if the object is determined to be an object containing call-back traffic, such as an object of interest to the call-back traffic pre-filter, (YES at block 915), the object of interest is routed, from the call-back traffic pre-filter, to the call-back traffic subsystem (of the static analysis engine 207) for processing (block 920).

In one embodiment, as the call-back traffic subsystem is located within the static analysis engine, the processing of the call-back traffic subsystem includes deep-packet inspection (DPI) and/or performance of a static analysis using at least exploit signature checks and/or vulnerability signature checks on the objects of interest. In particular, the exploit matching logic within call-back traffic subsystem may perform a comparison of one or more pre-stored exploit signatures from signatures rule set with the object of interest. In particular, the call-back traffic subsystem may perform a heuristic analysis to determine whether the object of interest contains queries to one or more particular IP addresses present on a list of IP addresses known to contain malicious content or simply prohibited by the administer or security technician associated with the client device.

If, based on the processing by the call-back traffic analysis engine, the object of interest is not determined to have characteristics that suggest the object is an exploit and/or is associated with a malicious attack, the network security device may allow the object, and associated packets or flows if applicable, to pass to the client device (NO at block 925). However, if the object of interest is determined to have characteristics that suggest the object is an exploit and/or is associated with a malicious attack (YES at block 925), the network security device may optionally alert the appropriate administer or security technician of the presence of malicious content (block 930), prevent the transmission of the object, and possibly any packets or flows associated with the object, or allow transmission of the object and perform further processing such as VM-based processing within the dynamic analysis engine.

III. Second Embodiment—Host Comprising Subsystems Supporting Dynamic Analysis and Limited Static Analysis Subsystems

A. General Architecture

Figure 10:
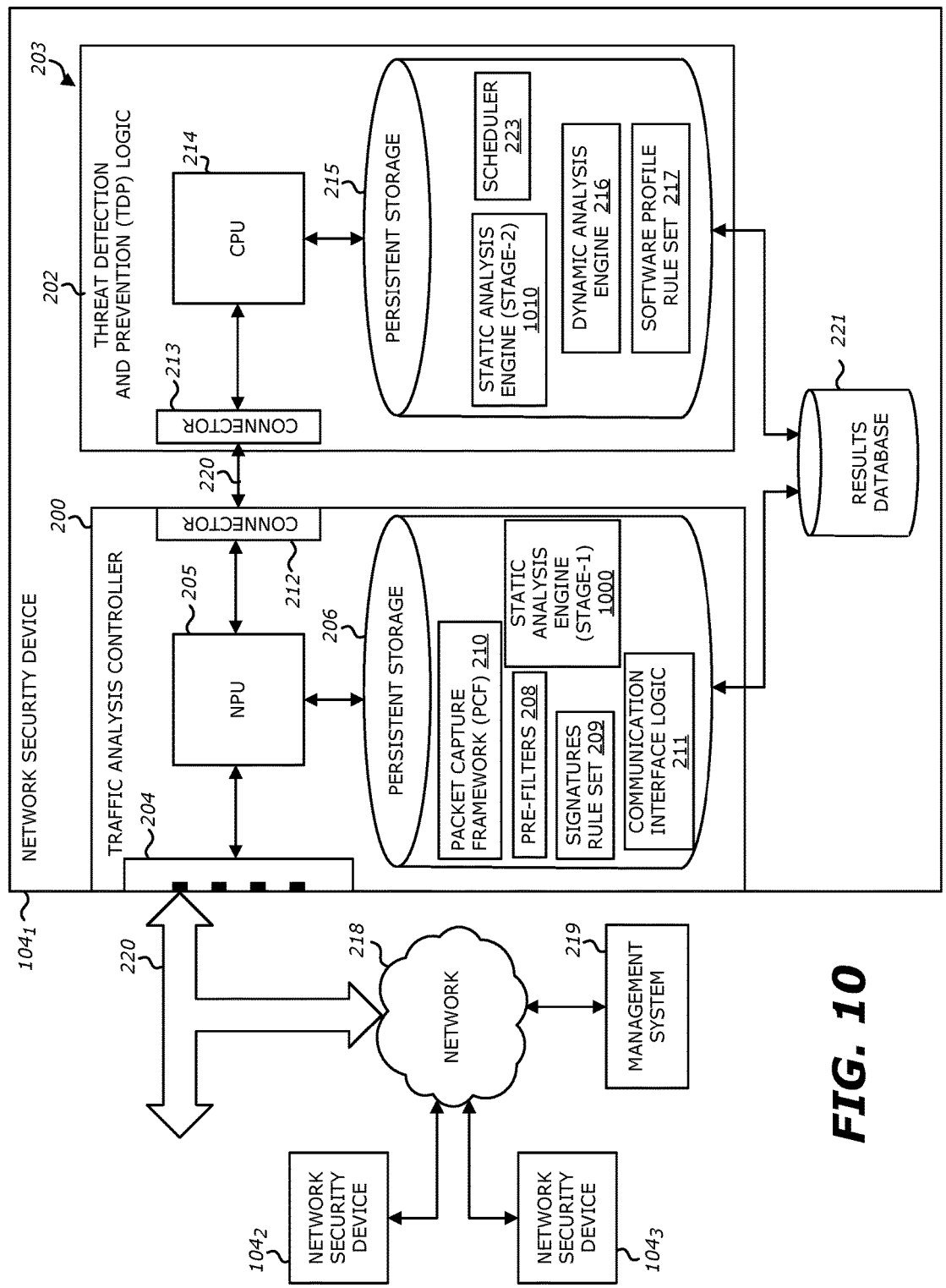
FIG. 10 is an illustration of a second exemplary block diagram of a plurality of network security devices communicatively coupled to a management system via a network.

Referring to FIG. 10, a second exemplary block diagram of a plurality of network security devices $104_1$-$104_N$ (N≥1, e.g., N=3) communicatively coupled to a management system 219 via the communication network 218 is shown. In general, as discussed above, management system 219 is adapted to manage network security devices $104_1$-$104_3$. For instance, management system 219 is responsible for automatically updating one or more exploit signatures and/or vulnerability signatures used by the static analysis engine 207 within some or all of network security devices $104_1$-$104_N$. Each of these signatures may represent a prior detected exploit or an uncovered software vulnerability. Such sharing may be conducted automatically or manually uploaded by an administrator. Also, such sharing may be conducted freely among the network security devices $104_1$-$104_3$ or subject to a subscription basis.

More specifically, according to this embodiment of the disclosure, the TDP logic 202 comprises both the static analysis engine 207 and the dynamic analysis engine 216, while the traffic analysis controller (TAC) 200 comprises the packet capture framework (PCF) 210 and a set of pre-filters 208.

A. Traffic Analysis Controller

Still referring to FIG. 10, the traffic analysis controller 200 comprises communication ports 204, a network processing unit (NPU) 205, connector 212 and persistent storage 206. The persistent storage maintains several software modules including a first stage of static analysis engine 1000, packet capture framework (PCF) 210, the set of pre-filters 208 and the signatures rule set 209. The communication ports 204 connect the network security device $104_1$ to communications networks 101 and/or 218 while connector 212 connects the traffic analysis controller 200 to the TDP logic 202.

In this embodiment, as shown in FIGS. 1 and 10, the PCF 210 controls the flow of the network traffic received by the network security device 104 (e.g., network security device $104_1$). Specifically, the PCF 210 confirms that the network security device $104_1$ is operating properly according to the deployment scenario of the network security device $104_1$. For instance, if the network security device $104_1$ is deployed off-line (passive mode), the PCF 210 ensures that the network security device $104_1$ receives a copy of the received network traffic and passes the copy of the received network traffic to the pre-filters 208 while the network traffic is provided to one or more of the client device $105i$, . . . and/or $105_M$. In the off-line deployment scenario, the network security device $104_1$ does not block the network traffic from reaching the client device(s) $105_1$, . . . and/or $105_M$ while the static or dynamic analysis is being performed. The traffic analysis controller 200 may provide at least some of the original network traffic to the PCF 210 or duplicate at least some of the network traffic and provide the duplicated copy to the PCF 210.

Alternatively, if the network security device $104_1$ is deployed in-line, the PCF 210 does not permit the received network traffic to pass through the network security device $104_1$ to the client device(s) $105i$, . . . , or $105_M$ until the network security device $104_1$ has determined the received network security traffic does not contain malicious content. In the in-line deployment scenario, the PCF 210 ensures that the received network traffic passes to one or more of the client device $105i$, . . . and/or $105_M$, after processing, unless it contains malicious content, in which case, at least some of the network traffic may be blocked from reaching its intended destination and an alert may be issued.

As described above, the pre-filters 208 may comprise four pre-filters searching for four types of traffic including: (1) DNS traffic, (2) traffic containing call-back activity, (3) communication protocol traffic, and (4) traffic containing at least one binary. In such an embodiment, the four pre-filters correspond to the following subsystems of the dynamic analysis engine 216, namely the communication protocol traffic subsystem and the binary traffic subsystem, or the static analysis engine 207, namely the DNS traffic subsystem and the call-back traffic subsystem. It should be noted that the set of pre-filters 208 may be located on the traffic analysis controller 200 while the static analysis engine 207 and the dynamic analysis engine 216 are located in the TDP logic 202.

The first stage of static engine 1000 performs certain functionality, such as signature matching for example, which is off-loaded from the TDP logic 202 to be handed at the traffic analysis controller 200. A second stage of static engine 1010 performs other functionality, such as heuristic analysis for example, is continued to be handled at the TDP logic 202. It is contemplated that first stage of static engine 1000 may perform heuristic analysis while the second stage of static engine 1010 performs other functionality such as signature matching. The goal is to off-load a portion of the static analysis to the traffic analysis controller 200.

B. TDP Logic

Still referring to FIG. 10, in communication with traffic analysis controller 202 via transmission medium 220, the TDP logic 202 comprises the second connector 213, the CPU 214 and the persistent storage 215. The second connector 213 enables the TDP logic 202 to communicate with the traffic analysis controller 200. The persistent storage 215 comprises software modules including the static analysis engine 207, the scheduler 223, the dynamic analysis engine 216 and the software profile rule set 217.

As described above, the static analysis engine 207 may comprise the DNS traffic subsystem and the call-back traffic subsystem, but signature matching associated with these subsystems is handled at the traffic analysis controller 200. The dynamic analysis engine 216, located on the host 203, comprises the communication protocol traffic subsystem and the binary traffic subsystem. However, in this embodiment, the TDP logic 202 include portions of the DNS and call-back traffic subsystems, which are executed on the CPU 214 associated with the TDP logic 202.

In general, the static analysis engine 207 and the dynamic analysis engine 216 perform in a similar manner as described above in the first embodiment, however in this embodiment, both engines, including all subsystems, are executed on the CPU 214 of the threat detection and prevention logic 203.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A server, comprising:
a first blade server including a first processing unit and a filtering logic that, when executed by the first processing unit, is configured to receive a first plurality of objects and identify, without execution of any object of the first plurality of objects, at least a first object of the first plurality of objects having characteristics associated with a malicious attack; and
a second blade server communicatively coupled to the first blade server, the second blade server includes a second processing unit being different from the first processing unit, the second processing unit to (i) process at least the first object provided from the first blade server when the first object includes characteristics associated with a malicious attack, (ii) monitor at least behaviors of the first object during processing, and (iii) determine whether any of the monitored behaviors correspond to activities indicative that the first object is associated with a malicious attack.

2. The server of claim 1, wherein the second blade server further comprising reporting logic that, when executed by the second processing unit, issues an alert message identifying at least the first object being associated with a malicious attack.

3. The server of claim 2, wherein the alert message includes a text message.

4. The server of claim 1, wherein the second blade server being implemented as part of a cloud computing service.

5. The server of claim 1, wherein the first blade server to perform one or more exploit signature checks that include a comparison of one or more pre-stored exploit signatures to content of the first object.

6. The server of claim 1, wherein the first blade server to perform an heuristic analysis that analyzes the first object using metadata or attributes of the first object to determine whether a certain portion of the first object has characteristics that suggest the first object is associated with a malicious attack.

7. The server of claim 1, wherein the second blade server includes at least one virtual machine that is configured to process the content within at least the first object.

8. The server of claim 1, wherein the one or more characteristics further comprise a particular source address that is associated with a known exploit.

9. The server of claim 1, wherein the one or more characteristics further comprise a particular destination address that is associated with a known exploit.

10. A system, comprising:
a network security device configured to determine whether an object includes one or more characteristics associated with a malicious attack without execution of the object, the one or more characteristics include at least a Uniform Resource Locator (URL) that suggests the object is associated with a known exploit; and
a cloud computing service communicatively coupled to and remotely located from the network security device, the cloud computing service including a virtual execution logic that, upon execution of the object by a processing unit deployed as part of the cloud computing service and, after the network security device determining that content of the object includes the one or more characteristics associated with the malicious attack, monitors for behaviors of the object suggesting the object is associated with a malicious attack.

11. The system of claim 10, wherein the cloud computing service further comprising reporting logic that, when executed by the processing unit, transmits an alert message to a network administrator, user, or another entity upon identifying at least the object being associated with a malicious attack.

12. The system of claim 10, wherein the network security device to perform one or more exploit signature checks that include a comparison of one or more pre-stored exploit signatures to the content of the object.

13. The system of claim 10, wherein the network security device to perform an heuristic analysis that analyzes the object using metadata or attributes of the object to determine whether a certain portion of the object has characteristics that suggest the object is associated with a malicious attack.

14. The system of claim 10, wherein the virtual execution logic that, upon execution by the processing unit, includes at least one virtual machine that is configured to process the object.

15. The system of claim 10, wherein the virtual execution logic is deployed within a dynamic analysis engine implemented within the cloud computing service.

16. The system of claim 15, wherein the dynamic analysis engine includes one or more software modules being executed by the processing unit within the cloud computing service that are configured to process the object and monitor for the behaviors of the object.

17. The system of claim 16, wherein the processing unit is a virtual processor.

18. A system, comprising:
a network security device configured to determine whether an object includes one or more characteristics associated with a malicious attack without execution of the object, the one or more characteristics include a particular source address that suggests the object is associated with a known exploit; and
a cloud computing service communicatively coupled to and remotely located from the network security device, the cloud computing service including a virtual execution logic that, upon execution of the object by a processing unit deployed as part of the cloud computing service and, after the network security device determining that content of the object includes the one or more characteristics associated with the malicious attack, monitors for behaviors of the object suggesting the object is associated with a malicious attack.

19. The system of claim 18, wherein the cloud computing service further comprising reporting logic that, when executed by the processing unit, transmits an alert message to a network administrator, user, or another entity upon identifying at least the object being associated with a malicious attack.

20. The system of claim 18, wherein the network security device to perform one or more exploit signature checks that include a comparison of one or more pre-stored exploit signatures to the content of the object.

21. The system of claim 18, wherein the network security device to perform an heuristic analysis that analyzes the object using metadata or attributes of the object to determine whether a certain portion of the object has characteristics that suggest the object is associated with a malicious attack.

22. The system of claim 18, wherein the virtual execution logic that, upon execution by the processing unit, includes at least one virtual machine that is configured to process the object.

23. The system of claim 18, wherein the virtual execution logic is deployed within a dynamic analysis engine implemented within the cloud computing service.

24. The system of claim 23, wherein the dynamic analysis engine includes one or more software modules being executed by the processing unit within the cloud computing service that are configured to process the object and monitor for the behaviors of the object.

25. The system of claim 24, wherein the processing unit is a virtual processor.

26. A system, comprising:
a network security device configured to determine whether an object includes one or more characteristics associated with a malicious attack without execution of the object, the one or more characteristics include a particular destination address that suggests the object is associated with a known exploit; and
a cloud computing service communicatively coupled to and remotely located from the network security device, the cloud computing service including a virtual execution logic that, upon execution of the object by a processing unit deployed as part of the cloud computing service and, after the network security device determining that content of the object includes the one or more characteristics associated with the malicious attack, monitors for behaviors of the object suggesting the object is associated with a malicious attack.

27. The system of claim 26, wherein the cloud computing service further comprising reporting logic that, when executed by the processing unit, transmits an alert message to a network administrator, user, or another entity upon identifying at least the object being associated with a malicious attack.

28. The system of claim 26, wherein the network security device to perform one or more exploit signature checks that include a comparison of one or more pre-stored exploit signatures to the content of the object.

29. The system of claim 26, wherein the network security device to perform an heuristic analysis that analyzes the object using metadata or attributes of the object to determine whether a certain portion of the object has characteristics that suggest the object is associated with a malicious attack.

30. The system of claim 20, wherein the virtual execution logic that, upon execution by the processing unit, includes at least one virtual machine that is configured to process the object.

31. The system of claim 26, wherein the virtual execution logic is deployed within a dynamic analysis engine implemented within the cloud computing service.

32. The system of claim 31, wherein the dynamic analysis engine includes one or more software modules being executed by the processing unit within the cloud computing service that are configured to process the object and monitor for the behaviors of the object.

33. The system of claim 32, wherein the processing unit is a virtual processor.

* * * * *